United States Patent
Brandes et al.

(10) Patent No.: US 8,521,637 B2
(45) Date of Patent: Aug. 27, 2013

(54) SYSTEMS, METHODS, AND COMPUTER PROGRAM PRODUCTS FOR PROVIDING REAL TIME ANALYTIC WIDGETS IN A FINANCIAL TRADING SYSTEM

(75) Inventors: Yossef Brandes, New York, NY (US); Maria Mei, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 808 days.

(21) Appl. No.: 12/576,160

(22) Filed: Oct. 8, 2009

(65) Prior Publication Data
US 2010/0125534 A1 May 20, 2010

Related U.S. Application Data

(63) Continuation-in-part of application No. 11/476,895, filed on Jun. 29, 2006, now Pat. No. 7,680,718.

(60) Provisional application No. 61/103,719, filed on Oct. 8, 2008.

(51) Int. Cl.
G06Q 40/00 (2012.01)

(52) U.S. Cl.
USPC .............. 705/37; 705/36 R; 705/35; 705/1.1

(58) Field of Classification Search
USPC .............. 705/1.1, 37, 36 R, 35, 4; 715/712, 715/744, 778; 345/173, 420
See application file for complete search history.

(56) References Cited

U.S. PATENT DOCUMENTS

| | | | |
|---|---|---|---|
| 5,402,521 A | 3/1995 | Niida et al. | |
| 5,761,386 A | 6/1998 | Lawrence et al. | |
| 6,966,036 B2* | 11/2005 | Nason et al. | 715/778 |
| 7,315,835 B1 | 1/2008 | Takayasu et al. | |
| 2003/0120535 A1 | 6/2003 | Duka | |
| 2004/0225567 A1 | 11/2004 | Mitchell et al. | |
| 2004/0254870 A1 | 12/2004 | Chitaley et al. | |
| 2008/0250326 A1 | 10/2008 | Mather | |
| 2010/0076906 A1* | 3/2010 | Eubank et al. | 705/36 R |

FOREIGN PATENT DOCUMENTS

| | | | |
|---|---|---|---|
| JP | 2001022849 A | 1/2001 | |
| JP | 2001155056 A | 6/2001 | |
| JP | 2002169957 A | 6/2002 | |
| JP | 2002197283 A | 7/2002 | |

(Continued)

OTHER PUBLICATIONS

"Quantex Analytics", RBC Dominion Securities Inc. and Investment Technology Group, Inc., Toronto, Canada, May 7, 1993, pp. 1-26.*

(Continued)

*Primary Examiner* — John H Holly
(74) *Attorney, Agent, or Firm* — Rothwell, Figg, Ernst & Manbeck, P.C.

(57) ABSTRACT

Methods, systems, and computer program products are provided for providing real time analytics and monitoring to a user of a securities trading system. In one embodiment, a list of one or more securities may be selected from a trading blotter and a widget engine may obtain one or more analytics for the list of one or more securities based on real time market and/or transaction cost data. The widget engine may display a graphical representation of the analytics in a manner that compliments the workflow of a trader. The graphical representation may be automatically updated based on real-time market data.

46 Claims, 23 Drawing Sheets

(56) References Cited

FOREIGN PATENT DOCUMENTS

| JP | 2002352082 A | 12/2002 |
| JP | 2004280810 A | 7/2004 |
| JP | 200592508 A | 4/2005 |
| JP | 2006527889 A | 12/2006 |
| WO | 0161546 A2 | 8/2001 |
| WO | 2004097553 A2 | 11/2004 |
| WO | 2004114189 A1 | 12/2004 |

OTHER PUBLICATIONS

Notice of Reasons for Rejection for corresponding Japanese Application No. 2008-520288 dated Nov. 15, 2011, 6 pages.
Written Opinion dated Feb. 3, 2010, for Singapore Patent Application No. 200718982-2, 4 pages.
International Search Report dated Jan. 5, 2011, for European Patent Application No. 10187050.9. 6 pages.

* cited by examiner

FIG. 2

| Trg Size | Remain | Open | Filled | % Done | Avg Price | | VWAP |
|---|---|---|---|---|---|---|---|
| 22,000 | 0 | 8,950 | 13,050 | 59% | 17.563 | | $14.836 |
| 25,400 | 0 | 22,000 | 3,400 | 13% | 13.508 | | $13.521 |
| 26,800 | 0 | 12,000 | 14,800 | 55% | 15.197 | List Pre-Trade | $2.680 |
| 3,800 | 0 | 2,650 | 1,150 | 30% | 92.201 | List Monitor | $91.211 |
| 5,100 | 0 | 3,850 | 1,250 | 25% | 67.251 | List PnL | $67.228 |
| 4,700 | 0 | 3,250 | 1,450 | 31% | 80.031 | Volume Monitor | $79.866 |
| 4,400 | 0 | 3,250 | 1,150 | 26% | 81.037 | Trade Progress | $81.323 |
| 66,700 | 0 | 65,900 | 800 | 1% | 4.635 | Trade Distribution | $4.794 |
| 4,700 | 0 | 3,250 | 1,450 | 31% | 74.607 | Recommended Strategy | $74.762 |
| 10,700 | 0 | 5,750 | 4,950 | 46% | 34.343 | Risk Monitor | $24.861 |
| 19,700 | 0 | 7,375 | 12,325 | 63% | 21.534 | | $9.8205 |
| 2,200 | 0 | 550 | 1,650 | 75% | 167.576 | Order Dialog... F4 | 132.758 |
| 10,700 | 0 | 2,900 | 7,800 | 73% | 38.142 | Execute Ctrl+E | $33.542 |
| 5,300 | 0 | 3,850 | 1,450 | 27% | 51.566 | Lock | $52.516 |
| 8,800 | 0 | 2,350 | 6,450 | 73% | 45.614 | Unlock | $50.713 |
| 8,300 | 0 | 2,150 | 6,150 | 74% | 47.817 | Freeze | $48.131 |
| 13,900 | 0 | 6,500 | 7,400 | 53% | 26.6111 | Unfreeze | $26.008 |
| 7,100 | 0 | 5,950 | 1,150 | 16% | 42.6011 | Select All Ctrl+A | $42.865 |
| 18,000 | 0 | 8,450 | 9,550 | 53% | 21.392 | | $18.511 |
| 3,400 | 0 | 2,650 | 750 | 22% | 118.883 | Cancel Order Options ▲ | 119.070 |
| 14,800 | 0 | 14,700 | 100 | 1% | 28.3100 | Resend Client Reports | $28.400 |
| | | | | | | Assign Entry Owner ▲ | |

950

| ACE Cost Summary | | | | | | | | |
|---|---|---|---|---|---|---|---|---|
| | | | | Expected ACE Cost | | ACE Cost Std Dev | | |
| | %List | Shares | Names | Value (USD) | USD/share | bps | USD/share | bps | ACE Cost Total |
| Total | | 1,235,800 | 95 | 33,938,862 | 0.014 | 5 | 0.064 | 23 | 17,488 |
| Buy | 51% | 672,600 | 49 | 17,447,104 | 0.013 | 5 | 0.064 | 32 | 8,770 |
| Sell | 49% | 563,200 | 46 | 16,491,738 | 0.015 | 5 | 0.095 | 33 | 8,719 |

| Highest Cost Trades | | | | | |
|---|---|---|---|---|---|
| Ticker | Name | Side | Shares | %List | Total Cost |
| CCU | COMPANIA CERVECERIA UNIDAS SA SPN ADR | Sell | 12,300 | 1.17% | 1,730 |
| UDB | UNISYS CORP COM | Buy | 65,100 | 0.78% | 822 |
| S | SPRINT NEXTEL CORP COM | Buy | 62,300 | 1.27% | 473 |
| F | FORD MOTOR CO COM | Buy | 66,700 | 0.98% | 404 |
| CBC | COMPUTER SCIENCES CORP COM | Sell | 9,600 | 1.19% | 400 |

| Largest Trades as % MDV | | | | | |
|---|---|---|---|---|---|
| Ticker | Name | Side | Shares | %List | % MDV |
| CCU | COMPANIA CERVECERIA UNIDAS SA SPN ADR | Sell | 12,300 | 1.17% | 22.11% |
| UDB | UNISYS CORP COM | Buy | 85,100 | 0.78% | 2.40% |
| OMX | OFFICEMAX INC COM | Buy | 19,200 | 0.66% | 1.04% |
| CSC | COMPUTER SCIENCES CORP COM | Sell | 9,600 | 1.19% | 0.92% |
| BDK | BLACK & DECKER CORP COM | Buy | 5,700 | 1.03% | 0.71% |

| Largest Trades by Value | | | | | |
|---|---|---|---|---|---|
| Ticker | Name | Side | Shares | %List | Value |
| AMSN | AMGEN INC COM | Buy | 9,300 | 1.73% | 587,354 |
| BUD | ANHEUSER-BUSH COS INC COM | Buy | 8,300 | 1.83% | 583,893 |
| NSC | NORFOLK SOUTHERN CORP COM | Sell | 7,100 | 1.42% | 481,877 |
| BAX | BAXTER INTERNATIONAL INC COM | Buy | 6,900 | 1.34% | 486,435 |
| HNZ | HEINZ HJ CO COM | Buy | 8,800 | 1.23% | 452,264 |

| Risk Reducing Trades | | | | | |
|---|---|---|---|---|---|
| Ticker | Name | Side | Shares | %List | MCR Rel |
| ATI | ALLEGHENY TECHNOLOGIES INC COM | Buy | 5,200 | 0.52% | -0.24% |
| F | FORD MOTOR CO COM | Buy | 86,700 | 0.96% | -0.28% |
| ULS | UNISYS CORP COM | Buy | 85,100 | 0.78% | -0.23% |
| S | SPRINT NEXTEL CORP COM | Buy | 62,300 | 1.27% | -0.21% |
| HNZ | ROCKWELL AUTOMATION INC COM | Buy | 7,000 | 0.78% | -0.20% |

FIG. 9D

SYSTEMS, METHODS, AND COMPUTER PROGRAM PRODUCTS FOR PROVIDING REAL TIME ANALYTIC WIDGETS IN A FINANCIAL TRADING SYSTEM

This application claims the benefit of Provisional Patent Application Ser. No. 61/103,719, filed Oct. 8, 2008, which is incorporated herein by reference in its entirety. This application is a continuation in part of and claims priority to pending U.S. patent application Ser. No. 11/476,895 filed on Jun. 29, 2006, the entire contents of which is incorporated herein by reference.

BACKGROUND OF THE INVENTION

1. Field of the Invention

The invention generally relates to systems, methods, and computer program products for providing real-time information to a user of a securities trading system. More particularly, aspects of the invention relate to providing one or more widgets that can display real-time graphical representations of analytics including real-time market information and intraday analysis of trade executions.

2. Description of the Background

Pre-trade planning has often been overlooked by portfolio managers and traders in the past, but in recent years it has become an important component of a superior investment process. The pre-trade planning phase can serve as a link between portfolio managers and traders where traders can share their insight and knowledge of the complicated trading environment with portfolio managers while portfolio managers can incorporate this additional insight and knowledge into their investment decisions. Additional information about the trading environment can be advantageous for an institutional trader or an investment manager, because execution costs can be large when compared against gross returns. A significant portion of these execution costs can be the price impact of trading (i.e., the effect of trades on the price of securities). For example, large "buy" orders can cause the price of the stock to rise, making the completion of these orders more costly to the investor. Similarly, large "sell" orders can cause the price of a stock to fall, making the completion of these orders less profitable to the trader. This realization as well as additional fragmentation in the markets and changes in regulation have increased the popularity of pre-trade models amongst traders to minimize or avoid the price impact of trading.

Once a portfolio manager has made the assumptions and analysis necessary to determine asset allocations and create a portfolio of securities, it is important that he or she convey those underlying assumptions to the trading desk or the trader who is about to execute the orders. Making clear the time frame in which the portfolio manager expects to accomplish the program and the cost estimates the manager expects can save all parties significant expense.

Even after gathering the underlying assumptions, traders still have substantial leeway in planning their execution strategies. With careful pre-trade strategy planning, a trader's benchmark, in many ways, becomes the cost profile a portfolio manager expects to achieve. The trader can then consider different trading strategies that will fit or "beat" the estimated cost benchmark that was agreed.

When planning an execution strategy, traders typically consider the relationship between price impact and opportunity cost (the risk that an advantageous opportunity will be lost by delaying a trade). An aggressive strategy (i.e., executing more of the trade in a shorter time frame) will typically increase price impact and lower opportunity cost. A passive strategy (i.e., delaying the execution of a greater portion of the trade), by contrast, will reduce price impact but increase opportunity cost. A selected execution strategy will often take into account both the estimated costs of a portfolio manager's investment strategy and the price impact and opportunity costs of executing that strategy.

Current pre-trade analysis services typically provide a static view of estimated transaction costs. For example, traditional pre-trade reporting focuses on delivering an abundance of information, typically in a PDF or HTML "report" format, that can be used to help with strategy selection and ex-post trading performance analysis. However, the relatively static nature of the reports limits their usefulness during actual trading. Because these services are external to the portfolio manager's workflow, there can be a substantial delay between submitting the trade list and performing the recommended executions.

In addition, current systems typically omit what the inventors consider to be a critical piece of monitoring information: deviations from history and expectations as the reality of the trading day evolves. Performance will only match expectations if all the assumptions underlying a certain strategy hold true over the course of the entire trading day. Unforeseen events that occur in the course of the trading day can significantly alter the overall performance of execution. A volume-distribution strategy, for example, will be sensitive to news that alters the expected volume distribution underlying the automated strategy. News released in the midst of the trading day that produces a sudden spike in volume could cause disastrous results if the trader fails to modify the strategy to adapt to events as they happen. Once the trading day begins, traders need to work dynamically, changing strategy "on the fly" to meet events (e.g., to quickly identify underperforming orders, to determine what mid-course corrections are possible, etc.).

BRIEF SUMMARY OF THE INVENTION

It is an object of the present invention to provide new and improved systems and methods for providing dynamic, real-time analytics and monitoring capabilities to portfolio managers and traders without interrupting trading workflow.

According to an aspect of the present invention, a method is provided for providing real time analytics to a user of a securities trading system. In some embodiments, the method includes steps of receiving from the securities trading system one or more records corresponding to list of one or more securities (e.g., a plurality of securities) and a request for an analytic (e.g., selected from a menu of available analytics) for the one or more securities, receiving real-time market data for the securities (e.g. via a digital communication network), obtaining the requested analytic metric (e.g., based on the records and the real-time market data), and sending information corresponding to the analytic to a widget engine so that the widget engine may display a graphical representation of the analytic metric in a predetermined display area (e.g., a pop up window or a portion of a display area of the securities trading system). In some embodiments, the method also includes steps of detecting an update to at least one of the records and the market data and sending corresponding information to the widget engine so that the widget engine may update the graphical representation of the analytic. In some embodiments, the steps of detecting an update and sending the updated information are set to recur at a predetermined interval.

In some embodiments, the method further includes the steps of receiving a user interface coupled to the graphical representation of the requested analytic a request to modify a record in the securities trading system and sending to the securities trading system describing the requested modification.

In some embodiments, the method further includes receiving historical data for the list of securities. In some embodiments, the requested analytic is based at least in part on the received historical data.

In some embodiments, the market data includes transaction data related to the list of securities. In some embodiments, the step of detecting an update in the market data includes detecting an update in the transaction data.

In some embodiments, the step of obtaining the analytic includes obtaining (e.g., from the real-time market data) a real-time value of a specified variable for a security, obtaining an empirical distribution of other values of the specified variable, and comparing the real-time value with the empirical distribution of values to determine whether the condition of the security is abnormal. In some embodiments, the empirical distribution is a distribution of real-time values for the specified variable for a peer group of the security. In some embodiments, the empirical distribution is a distribution of historical values for the specified variable for the security over a specified period of time. In some embodiments, the specified variable is a relation between an estimated value of an attribute for a security and a real-time value of the attribute for the security.

According to an aspect of the present invention, a method is provided for providing real time analytics to a user of a securities trading system. In some embodiments, the method includes steps of displaying in a first predetermined display area a user interface for the securities trading system, sending to a widget engine a list of securities selected from the securities trading system and a request for an analytic (e.g., selected from a menu of available analytics) for the securities, receiving from the widget engine information (e.g., based on one or more records from the securities trading system and real-time market data) corresponding to the requested analytic, and displaying in a second pre-determined display area a graphical representation of the requested analytic. In some embodiments, the method also includes steps of receiving updated information (e.g., based on updated records or market data) from the widget engine, and displaying updated graphical representation of the requested analytic.

In some embodiments, interactions with the user interface for the securities trading system and the updates to the graphical representation do not interfere with each other.

According to an aspect of the present invention, a system is provided for providing real time analytics to a user of a securities trading system. In some embodiments, the system includes a computer and a widget engine module. In some embodiments, the computer is operable to display in a first predetermined display area a user interface of the securities trading system, and to display a menu for requesting an analytic from among a predetermined set of one or more analytics. In some embodiments, the widget engine module is operable to obtain an analytic (e.g., an analytic requested from the menu) for the one or more securities based on one or more records stored in the securities trading system and based on real-time market data, and to display in a second predetermined display area of the client computer a graphical representation of the requested analytic. In some embodiments, the widget engine module is also operable to update the requested analytic based on an update to at least one of the records and the market data, and to update the display of the graphical representation based on updates to the analytic.

According to an aspect of the present invention, a computer program product is provided for providing real time analytics to a user of a securities trading system. In some embodiments, the computer program product comprises a digital storage media and a set of machine readable instructions stored on the digital storage media. In some embodiments, the machine readable instructions are executable by a computer to receive from the securities trading system one or more records corresponding to a list of one or more securities and a request for an analytic (e.g., selected from a menu of available analytics) for the one or more securities, receiving real-time market data for the one or more securities (e.g., via a digital communication network), obtain the requested analytic (e.g., based on the records and the real-time market data, and sending information corresponding to the analytic to a widget engine so that the widget engine may display a graphical representation of the analytic metric in a predetermined display area (e.g., a pop up window or a portion of a display area of the securities trading system). In some embodiments, the computer program product also includes machine readable instructions executable by a computer to detect an update to the record or the market data and to send corresponding information to the widget engine so that the widget engine may update the graphical representation of the analytic.

According to an aspect of the present invention, a computer program product is provided for providing real time analytics to a user of a securities trading system. In some embodiments, the computer program product comprises a digital storage media and a set of machine readable instructions stored on the digital storage media. In some embodiments, the machine readable instructions are executable by a computer to display in a first predetermined display area a user interface for the securities trading system, send to a widget engine a list of one or more securities selected from the securities trading system and a request for an analytic (e.g., selected from a menu of available analytics) for the one or more securities, receive from the widget engine information (e.g., based on one or more records from the securities trading system and real-time market data) corresponding to the requested analytic, and display in a second predetermined display area a graphical representation of the requested analytic. In some embodiments, the computer program product also includes machine readable instructions executable by a computer to receive updated information corresponding to the requested analytic (e.g., based on updated records or updated market data) from the widget engine, and to an updated graphical representation of the requested analytic.

The methods, systems, and computer program product of the present invention help traders efficiently and quickly monitor trading progress by delivering real-time analytics and monitoring to a trading blotter in a securities trading system or other type of display. The present invention also enables real-time market data and trade lists to be combined so as to provide immediate and continuing feedback to traders. In some embodiments, such data can also be combined with real-time transaction data to allow traders to monitor transaction costs in real time without interrupting the trading workflow. The widgets of the present invention can present information in a graphical format that is easy to understand and use in a dynamically changing trading environment. In some embodiments, the analytic widgets can be implemented as an independent module or application that can be included in the trading workflow without requiring a change in the securities trading system.

The real-time monitoring tools of the present invention can help a trader identify abnormalities that can become significant cost drivers during the trading day. Many current automated strategies rely on volume, volatility, spread, and limit order book data as well. These factors and their forward projections are usually based on historical figures combined with a statistical method for predicting future movements. Most of the current pre-trade cost estimation models assume a normalized behavior; that is, most of the current models assume that volume, volatility and spread will be only slightly different in the future than their behavior over the preceding period. Quickly identifying behavior that diverges from this norm can help traders to respond in time with a change in strategy that will compensate for new trading patterns and thus reduce the risk of incurring higher costs as a result of such real-time factors. From simple volume signals to more sophisticated real-time models that predict movements of the best bid and ask, real-time monitoring tools can help traders respond in a timely fashion to news throughout the day.

By graphically displaying the trade prices, market prices and cost benchmarks, users can receive immediate feedback on how to adapt their trading to meet specific benchmarks. As new trades are executed and as new market data is processed, target prices can be immediately updated, allowing traders to make important decisions on how to continue trading securities in the list.

By using dynamic display areas (e.g., pop-up windows), the graphical representations of one or more analytics can be added, removed or configured as the user sees fit. This allows the analytics to be included in the trading workflow without interrupting the user's workflow.

Logging and standardizing these real-time events generated by a real-time monitoring system can also provide additional transparency and can be very useful in shedding light on an over- or under-performing strategy or trading period. In an era when traders are compensated by performance, a record of these events can become very important. Incorporating this information into the post-trade analysis sheds yet more light on performance and cost estimates going forward.

Other objects and advantages of the present invention will be apparent to those skilled in the art upon review of the detailed description of the preferred embodiments below and the accompanying drawings.

DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 2 illustrates an embodiment of a widget menu interacting with a trading blotter of a securities trading system according to the present invention.

FIG. 9D illustrates a report provided by the pre-trade widget of FIG. 9A according to an embodiment of the present invention.

DETAILED DESCRIPTION OF THE PREFERRED EMBODIMENTS

While the present invention may be embodied in many different forms, a number of illustrative embodiments are described herein, with the understanding that the present disclosure is considered as providing examples of the invention, and such examples are not intended to limit the invention to any specific preferred embodiment described and/or illustrated herein.

It will be readily understood by those skilled in the art that the present invention, as described herein, includes systems, processes, and components that may be implemented using one or more general purpose computers, microprocessors, or the like, programmed according to the teachings of the present specification. Appropriate software may be available that may be customized or used off-the-shelf to provide one or more components or steps of the present invention. Further, systems and methods of the present invention can be implemented with one or more computer program modules developed by skilled programmers in readily available computer languages such as C++, PHP, Python, HTML, XML, etc., based on the teachings of the present disclosure, as will be apparent to those skilled in the relevant art(s).

Similarly, one skilled in the art will understand that the present invention may be embodied in numerous configurations, including different computer architectures, such as centralized or distributed architectures and should not be limited to the exemplary architecture(s) disclosed herein. Moreover, one or more aspects of the present invention may include a computer-based product, which may be hosted on a storage medium and include executable code for performing one or more steps of the invention. Such storage mediums can include, but are not limited to, computer disks including floppy or optical disks or diskettes, CDROMs, magneto-optical disks, ROMs, RAMs, EPROMs, EEPROMs, flash memory, magnetic or optical cards, or any type of media suitable for storing electronic instructions and data, either locally or remotely.

Figure 1:
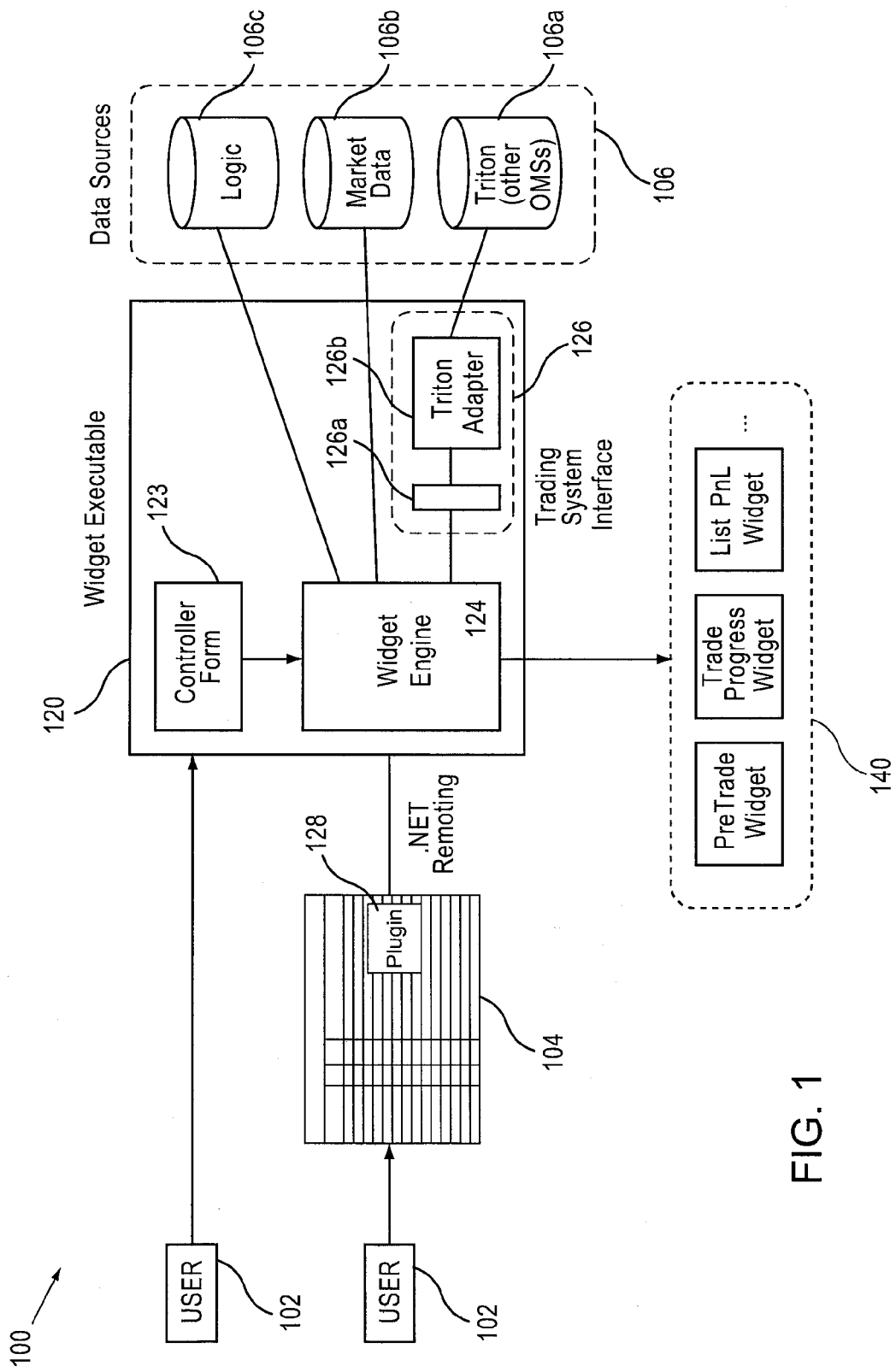
FIG. 1 illustrates a system for providing real time analytics to a user of a securities trading system according to an embodiment of the present invention.

FIG. 1 illustrates a logical block diagram of a system 100 for providing real time analytics and monitoring to a user of a securities trading system using widgets according to an embodiment of the present invention. The user 102 can be, for example, a client computer operated by a trader accessing or executing an interface of a trading system, an automated system directly interacting with the system 100 to display the widgets on one or more electronic display devices, etc. The system 100 includes a widget module 120 configured to access one or more data sources 106 (e.g., securities trading system database 106a ("STS database") storing order information, market data sources 106b, analytic engine modules 106c for providing investment analysis and recommendations, etc.) and to display graphical representations of analytics, e.g., within a trading system interface or blotter 104 at the request of a user 102. As used herein, a securities trading system can include an order management system ("OMS") such as Macgregor XIP®, an execution management system ("EMS") such as ITG Triton®, or any other similar system known to those of skill in the art that facilitates and manages the execution of securities orders. In some embodiments, the widget module 120 includes a computer program executing on the same computer that is displaying the trading system interface or blotter 104 (i.e., a client computer). In some embodiments, the widget module 120 includes a computer remote from the client computer that executes software for providing at least part of the functionality of the widget module 120. For example, in some embodiments the widget module 120 comprises a "thin client" portion or plugin 128 executing on a client computer and communicating with a "back end" portion executing on a remote computer server. In FIG. 1, the communication between the plugin 128 and the widget module 120 is via .NET Remoting. In other embodiments, the communication may utilize any other suitable inter-computer communication means understood by one skilled in the art (e.g., RPC, CORBA, SOAP, REST, HTTP, sockets, etc.). In some embodiments, all or part of the functionality of the widget module 120 can be provided by application specific integrated circuits ("ASICs") or other customized hardware. Other possible architectures and allocations of functionality between one or more computers will be understood by one having ordinary skill in the pertinent art.

According to embodiments of the present invention, "widgets" may be provided to a securities trading system for displaying and dynamically updating graphical representations of analytics. In computer software, a widget engine is a software service available to users for running and displaying widgets in a display area (e.g., a computer "desktop"). Desktop widgets, as understood by those of skill in the art, can be small applications (i.e., "applets") that give access to information and frequently used functions such as clocks, calendars, news aggregators, etc.

Also, the term "widget engine" is not to be confused with that of a widget toolkit. Widget toolkits are used by designers of GUIs, who combine several widgets to form a single application. A widget in a widget toolkit provides a single, low level interaction (e.g., a single interface "button"), and is prepared to communicate with other widgets in the toolkit. By contrast, the widget engines of the present invention are intended for end users and each widget is a stand-alone, task-oriented application which can be composed of several related interactions on its own to display analytics relating to securities trading within a trading system.

The use of widgets to display analytics in the present invention is advantageous for several reasons, including ease of development. Most of these widgets can be created with a few images and about 10 to several hundred lines of XML/JavaScript/VBScript source code. A single host software system, such as a web browser, runs all the loaded widgets. This allows several desktop widgets to be built sharing resources and code.

In an embodiment, the widget module 120 includes a controller form module 123 that generates or otherwise provides user interface controls (e.g., one or more drop down menus, toolbar buttons, panels, icons, etc.) to the user for requesting one or more real-time analytics. As illustrated in FIG. 1, the user interface controls can be displayed independently of, or integrated with, the trading system blotter 104. In an embodiment, the widget module 120 also includes a widget engine module 124.

In the embodiment illustrated in FIG. 1, the widget engine module 124 is configured to access one or more data sources 106 (e.g., STS database 106a storing order information, market data sources 106b, analytic engine modules 106c for providing investment analysis and recommendations, etc.). In an embodiment, the widget engine module 124 accesses the one or more data sources 106 via an electronic data network (e.g., LAN, WAN, fiber, the Internet, etc.). In an embodiment, the widget engine module 124 can access the data sources 106 independently of the securities trading system (e.g., the widget engine may access the data sources 106 via one or more communication channels that are physically or logically distinct from the communication channels utilized by the securities trading system).

In an embodiment, the widget engine module 124 accesses one or more of the data sources 106 (e.g., the STS database 106a) via one or more integration modules 126. As illustrated in FIG. 1, the widget engine module 124 utilizes a trading system interface module 126a and an OMS adapter 126b to access the STS database 106a. In some embodiments, the trading system interface module 126a provides a common widget interface for communicating with the widget engine module 124, and the OMS adapter 126b can be configured to translate data transmissions between the common widget interface and an interface specific to the STS database 106a. The integration modules 126 enable the widget engine module 124 to be reconfigured to communicate with a different STS database types by only adjusting one or more of the integration modules 126 (e.g., by substituting an appropriate OMS adapter 126b).

FIG. 2 illustrates an embodiment of a widgets menu, widgets panel, or controller form 122 according to the present invention. The widgets form 122 is displayed in a predetermined display area within a securities trading system interface 104 (e.g., a spreadsheet or trading blotter). As illustrated in FIG. 2, the trading system interface or blotter 104 displays a plurality of records 202. Each record 202 represents a security of interest to the user 102. For example, in some embodiments each record represents a pending order or position held in a particular security. In some embodiments, the display of each record includes fields for a target execution size 204 (i.e., the total amount of shares to transfer), shares remaining 205 (i.e., unplaced shares), an open order (i.e., placement) size 206, a completed order size 208, a percentage done 210 (i.e., the percentage of the target execution size 204 that has been completed, or the completed order size 208 divided by the target execution size 204), the average price of execution 212, the volume weighted average price 214 ("VWAP"), etc. An example of a suitable securities trading system and trading system interface or blotter 104 is the Triton EMS offered by the Investment Technology Group. Other embodiments of the trading system interface or blotter 104 may include less or additional information for each record, as would be understood by a person having ordinary skill in the art.

In the embodiment illustrated in FIG. 2, the controller form 122 includes a menu of analytic widgets available to a user 102 of the system 100. In this embodiment, the available widgets include "List Pre-Trade," "List Monitor," "List PnL," "Volume Monitor," "Trade Progress," "Trade Distribution," "Recommended Strategy," and "Risk Monitor." In some embodiments, the user 102 can invoke the controller form 122 by performing a predetermined action or operation in the trading system interface or blotter 104 (e.g., via an I/O device such as by "right clicking" on a selected security record 202). The widget controller form or menu 122 may be a drop down menu as shown, a panel or toolbar with one or more buttons or icons, or any other graphical user selection device. In some embodiments, a list of one or more securities 202 can be selected by the user and the controller form 122 may be invoked to request an analytic widget corresponding to the list of securities.

Figure 3:
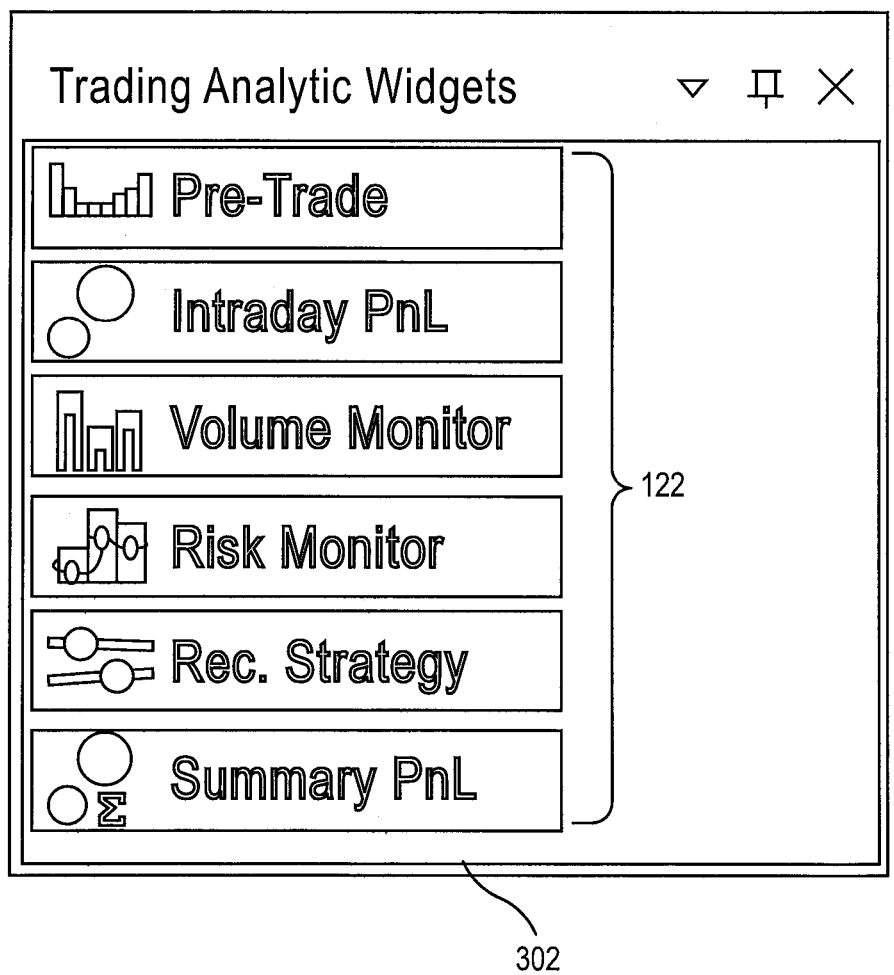
FIG. 3 illustrates another embodiment of a widgets menu according to the present invention.

FIG. 3 illustrates a widget controller form 122 according to another embodiment of the present invention. In this embodiment, the widget controller form 122 is displayed in an independent window 302 in a pre-determined area on the user's display. In the form shown, e.g., the available widgets include "Pre-Trade," "Intraday PnL," "Volume Monitor," "Risk Monitor," "Recommended Strategy," and "Summary PnL." Preferably, the menu window 302 remains visible in a predetermined area of the user's display area while the user 102 performs other actions.

Figure 4:
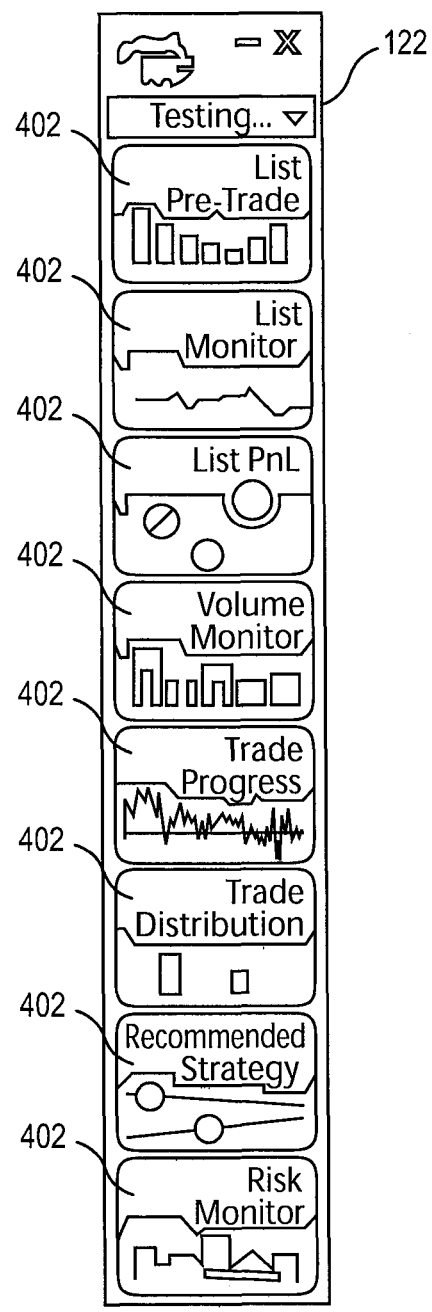
FIG. 4 illustrates yet another embodiment of a widgets menu according to the present invention.

FIG. 4 illustrates a widget controller form 122 according to another embodiment of the present invention. In the embodiment illustrated in FIG. 4, the controller form 122 includes one or more icons 402 that represent available analytic widgets. In the form shown, e.g., the available widgets include "List Pre-Trade," "List Monitor," "List PnL," "Volume Monitor," "Trade Progress," and "Trade Distribution," "Recommended Strategy," and "Risk Monitor." In some embodiments, the icons remains visible in a predetermined area of the user's display area while the user 102 performs other actions.

Referring again to FIG. 1, in an embodiment, the widget engine module 124 is operable to provide one or more graphical representations of requested analytics as one or more "analytic widgets" 140. For example, FIG. 1 illustrates a Pre-Trade widget, a Trade Progress widget, and a List PnL widget. In some embodiments, the widget engine module 124 generates the requested graphical representations (e.g., by generating a digital image file or numerical diagram) and sends the graphical representations to the display of the user 102. In some embodiments, the widget engine module 124 generates a description of the analytic (e.g., numerical or other data necessary to display the requested graphical representation) and sends the description to another portion of the widget module 120 (e.g., another portion of a widget engine module 124) for display on the display of the user 102.

Figure 5:
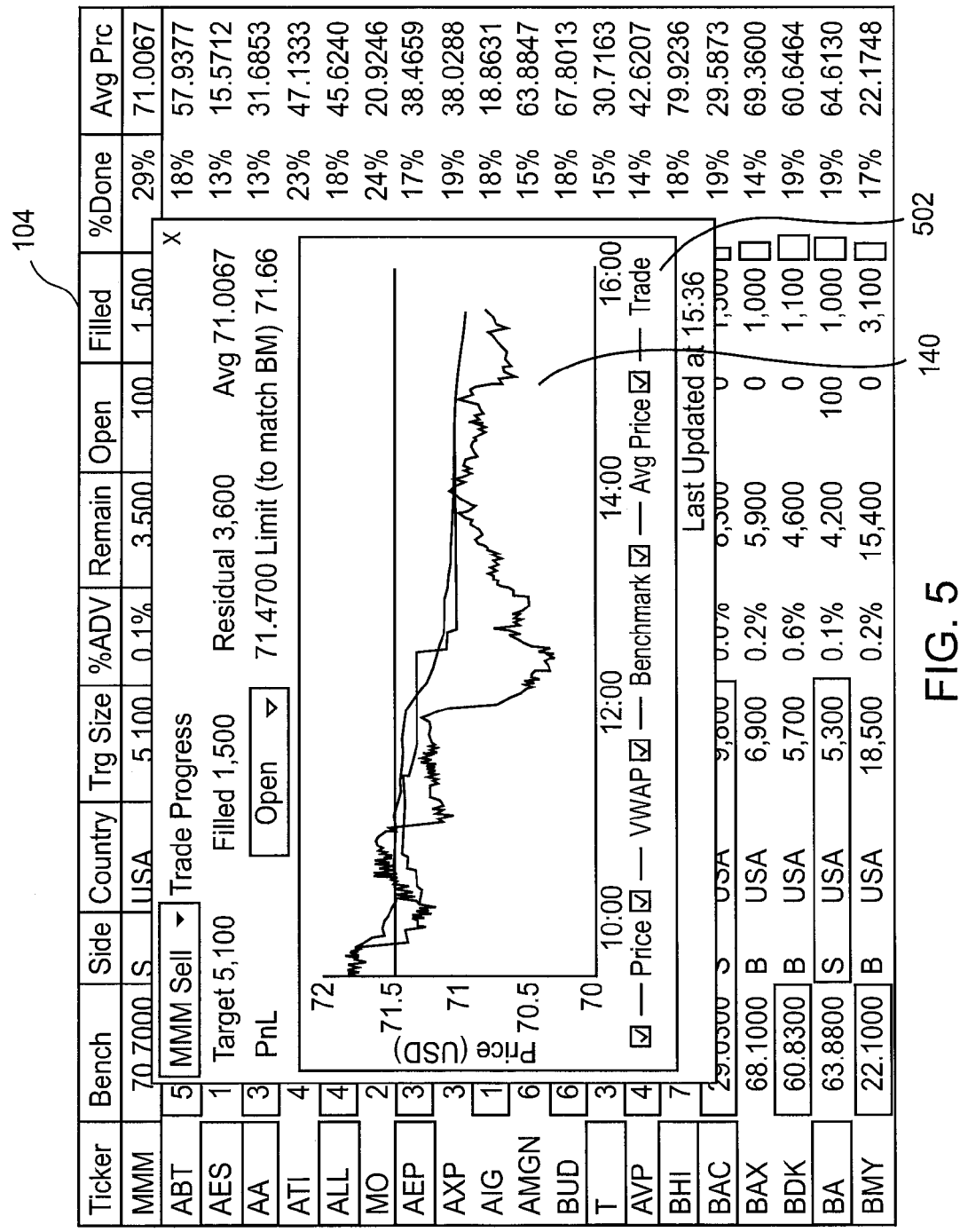
FIG. 5 illustrates a widget for providing an analytic in a trading blotter of a securities trading system according to an embodiment of the present invention.

FIG. 5 illustrates the display 140 of an analytic widget, displayed within a trading system interface or blotter 104 according to an embodiment of the invention. The analytic widget 140 illustrated in FIG. 5 displays a price of a security plotted over a period of time, one or more benchmarks, individual execution prices, and a running average execution price. The analytic widget 140 also displays a ticker symbol, target execution size, filled and residual shares, and an average execution price based on a record from the securities trading system. The analytic widget 140 also includes a drop down menu for selecting from one or more available benchmarks, and a recommended limit price for matching the selected benchmark. In this embodiment, the analytic widget 140 is displays a pop up window 502 that can be moved and viewed independently of the trading system interface or blotter 104. By using dynamic pop-up windows 502, analytic widgets 140 can be added, removed or configured as the user 102 sees fit. This allows the analytic widgets 140 to be included in the trading workflow without requiring a change to the trading system interface or blotter 104. The display area of the analytic widget 140 can be integrated into the trading system interface or blotter 104 using a plugin or applet (128 in FIG. 1) on the client workstation or by any other suitable means understood to those of ordinary skill in the art.

Figure 6:
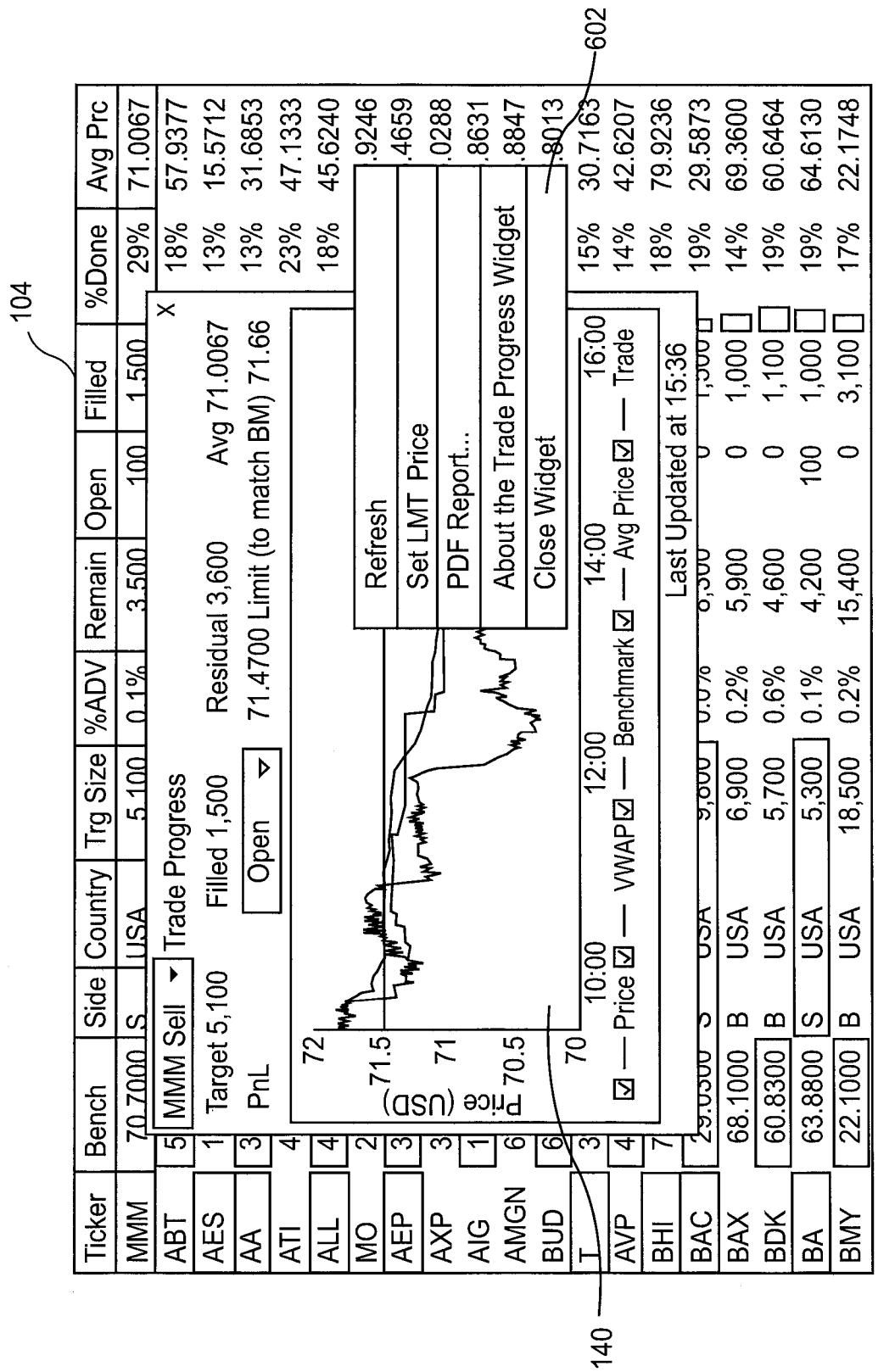
FIG. 6 illustrates an option menu for the widget shown in FIG. 5.

FIG. 6 illustrates an embodiment of the present invention in which the widget engine generates user interface elements 602 (e.g., a menu of options) selectable by the user to perform actions in relation to the displayed analytic widget 140. In the embodiment of FIG. 6, the menu options include "Refresh" (e.g., to manually update the displayed analytic), "Set LMT Price" (e.g., to update the corresponding record in the securities trading system with the suggested limit price), and "PDF Report" to request a detailed report of the performance of the security. The menu options also include an "About . . . " option to display information about the analytic widget 140, and a "Close Widget" option to end display of the analytic widget 140. In some embodiments, the user interface elements 602 are used to update records in the STS database 106a (e.g., to adjust target execution prices or other aspects of a trading strategy). One skilled in the art will readily understand the function of these menu options.

Figure 7A:
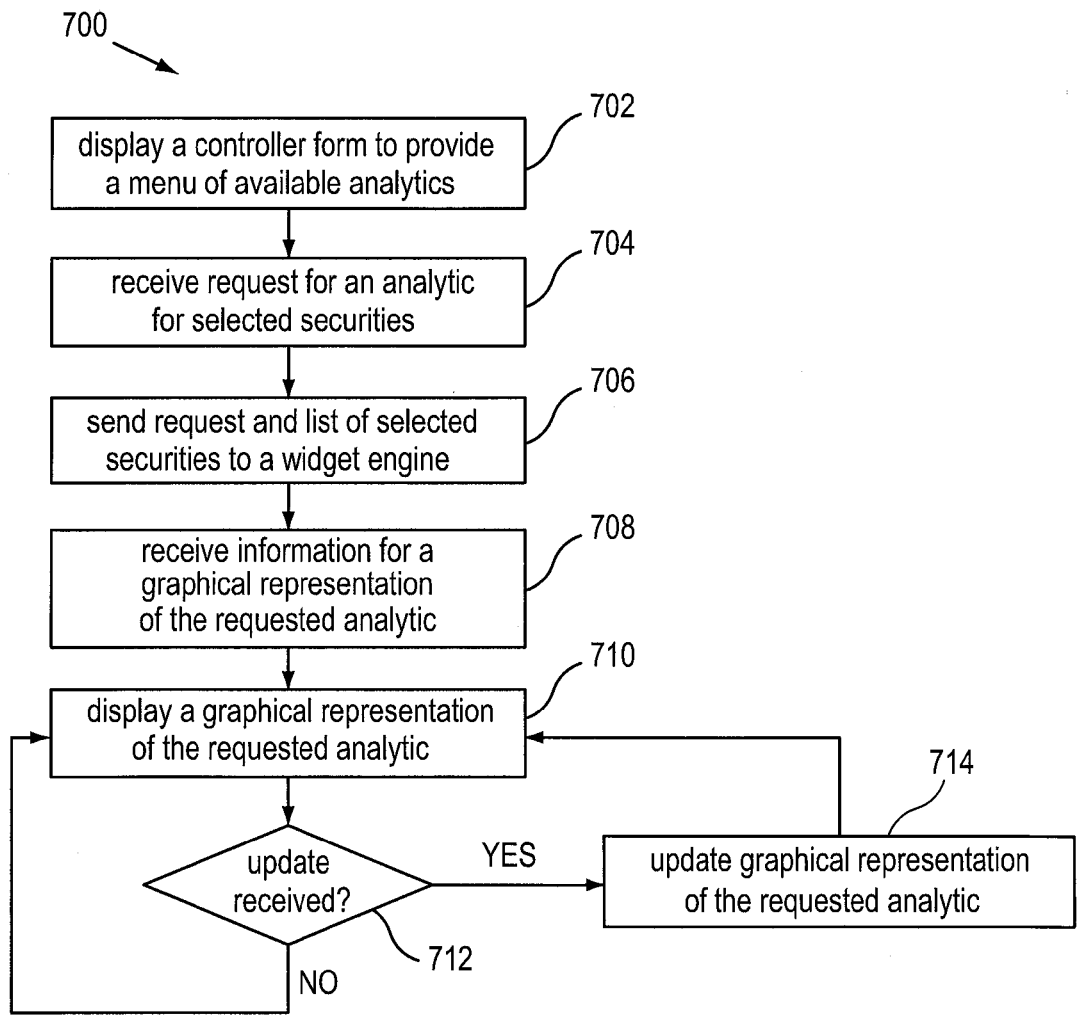
FIG. 7A is a flow chart illustrating a process for providing real-time analytics to a user of a securities trading system using widgets according to an embodiment of the present invention.

FIG. 7A is a flow chart illustrating a process 700 for providing real-time analytics to a user 102 of a securities trading system according to an embodiment of the present invention. Those of skill in the art will appreciate that the steps in the process 700 can be performed by hardware, firmware, or software stored in a computer readable medium and executed by one or more digital processors of a computer system. In other embodiments, all or part of the process 700 is encoded into special purpose hardware (e.g., one or more FPGAs or application specific integrated circuits ASICs). In some embodiments, all or part of the steps in the process 700 are performed by software executing on a client computer. In some embodiments, all or part of the steps in the process 700 are performed by another computer coupled to a client computer via a digital communication network.

The process 700 begins at step 702 when a widget module 120 (e.g., a widget module 120 or a portion of a widget module 120 executing on a client computer) displays a controller form 122 on a user's display. In some embodiments, the controller form 122 provides a predetermined set of analytic options. In some embodiments, the controller form 122 is displayed as an integrated part of the trading system interface of blotter 104. In other embodiments, the controller form 122 is displayed in a separate window.

At step 704, the controller form 122 receives a request for a selected analytic. In some embodiments, the request is initiated by a user 102 selecting the requested analytic from a menu of the controller form 122. In some embodiments, the request also includes a list of securities (e.g., a set of records selected from the trading system interface or blotter 104).

At step 706, the controller form 122 sends the request to the widget engine module 124. In some embodiments, the request includes an indication identifying the selected analytic and information identifying the selected list of securities. In some embodiments, the request also includes a set of one or more records (e.g., from a STS database 106a) corresponding the selected list of securities. In some embodiments, sending the request includes sending the request over a digital communication network from a client computer to another computer executing the widget engine module 124. In some embodiments, sending the request includes sending the request between processes executing on the same computer (e.g., via inter-process communications). Analogous methods of sending the request will be understood to persons of skill in the art.

At step 708, a widget engine module 124 (e.g., a widget engine module 124 or a portion of a widget engine module 124 executing on a client computer) receives information describing a graphical representation of the requested analytic. Preferably, the information is based on real-time market data for the list of securities. (As used herein, "real-time market data" means current market data obtained from or derived from a market feed data source.) In an embodiment, the information is also based on the one or more records. In some embodiments, the widget module 124 calculates the requested analytic to provide the information. In other embodiments, the information is received via a digital communication network (e.g., from another computer executing a portion of the widget engine module 124). In some embodiments, the received information comprises a digital image or other standard graphics format. In some embodiments, the received information comprises numerical information that describes salient features of the requested analytic and the graphical representation is generated by the widget engine module 124 based on the received description.

At step 710, the widget engine module 124 displays the graphical representation of the requested analytic in an analytic widget 140. In some embodiments, the analytic widget 140 is displayed directly by the widget engine module 124 or another component of the widget module 120. In some embodiments, the analytic widget 140 is displayed by another application (e.g., a web browser) executing on a client computer.

At step 712, the widget engine module 124 determines whether any updates to the requested analytic information have been received. In some embodiments, the update includes new information based on real-time market data of the list of securities (e.g., a change in the market price, volume, volatility, etc. of a security) or based on real-time data relating to transaction executions for the list of securities (e.g., an execution, partial execution, or other change in the STS database 106a). In some embodiments, the updated information is a description of differences between an updated analytic and the previously received information. In some embodiments, the updated information includes information for an entire updated analytic independent of the previously received information.

In the case that the widget engine module 124 has received updated information, at step 714 the widget engine module 124 updates the graphical representation of the analytic metric to reflect the updated information and displays the updated graphical representation (step 710).

In the case that the widget engine module 124 has not received any updated information, it will continue to display the graphical representation of the analytic metric. In some embodiments, the widget engine module 124 continues to display the graphical representation of the analytic metric while the user 102 performs other interactions with the trading system interface or blotter 104. At step 714, the widget engine module 124 updates the graphical representation of the analytic metric to reflect the updated information and displays the updated graphical representation (step 710).

In some embodiments, the widget engine module 124 is configured to monitor data sources and automatically detect updates to the requested analytic information after a predetermined period of time (e.g., every two minutes). In some embodiments, this may comprise querying a database (e.g., an OMS database, EMS database, or other securities trading system database 106a) to detect updated records. In some embodiments, this may comprise reading real-time data from a communication channel or data buffer.

Figure 7B:
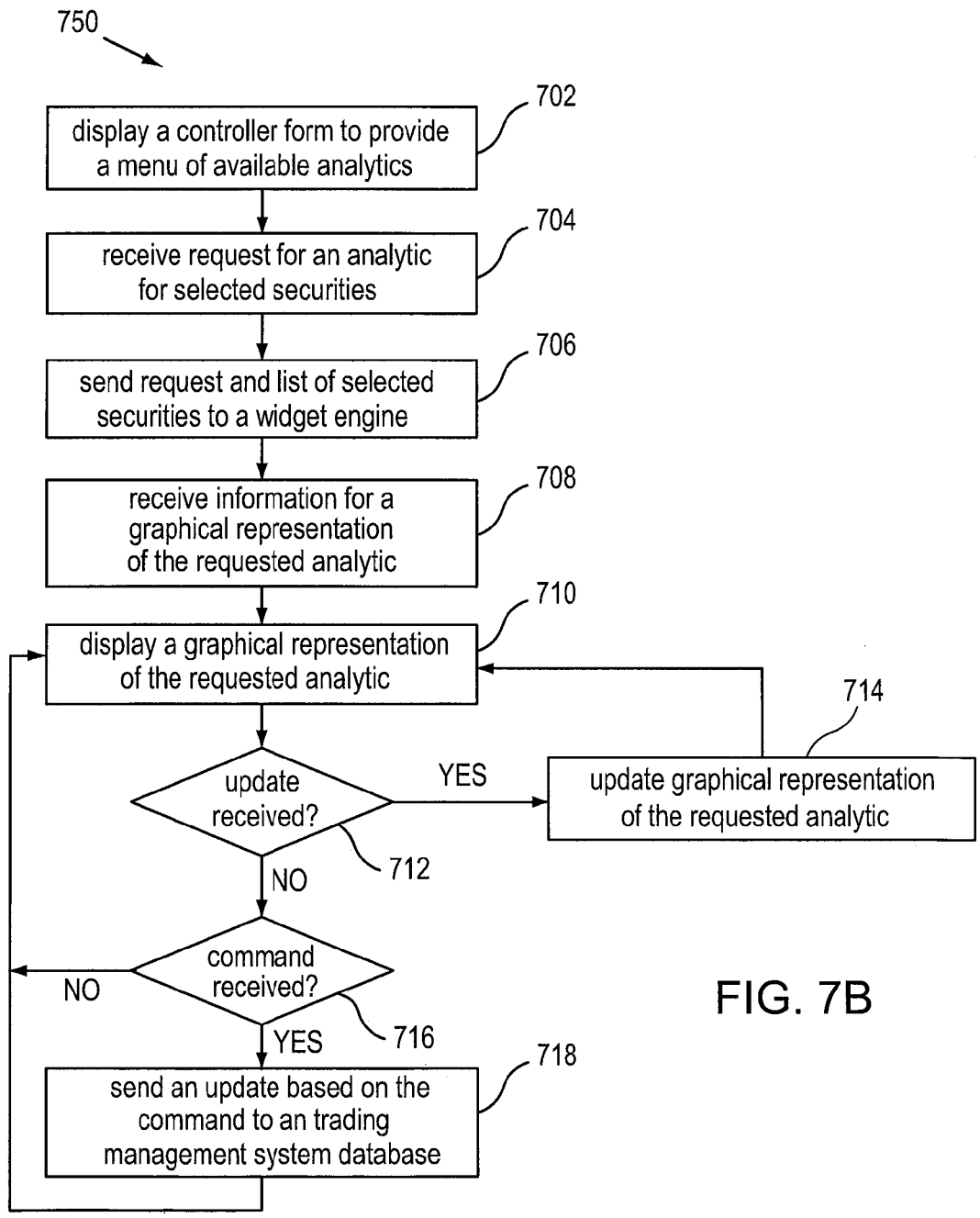
FIG. 7B is a flow chart illustrating a process for providing a real-time analytics to a user of a securities trading system using widgets according to an embodiment of the present invention.

In some embodiments, the analytic widget 140 includes user interface elements that enable a user 102 to interact with the analytic widget 140 and adjust trading strategies and other trading information directly from the analytic widget 140. FIG. 7B illustrates a process 750 for providing a real-time analytics to a user 102 of a securities trading system according to some aspects of the present invention. The process 750 is similar to the process 700 with some additional steps.

At step 716, the analytic widget 140 determines whether a command to update a record in the STS database 106a has been received from the user interface. For example, in some embodiments a user can select from a menu of trade strategies displayed in an analytic widget 140 or select data from the graphical representation of the analytic to update the records stored in the STS database 106a (e.g., to adjust a target price or share value).

At step 718, the analytic widget 140 sends the update indicated by the command to the STS database 106a. In some embodiments, the command is sent to the STS database 106a via the widget engine module 124. In other embodiments, the update is sent via the trading system management interface 104. In some embodiment, the update is sent to the STS database 106a directly or via an OMS integration module.

Figure 8A:
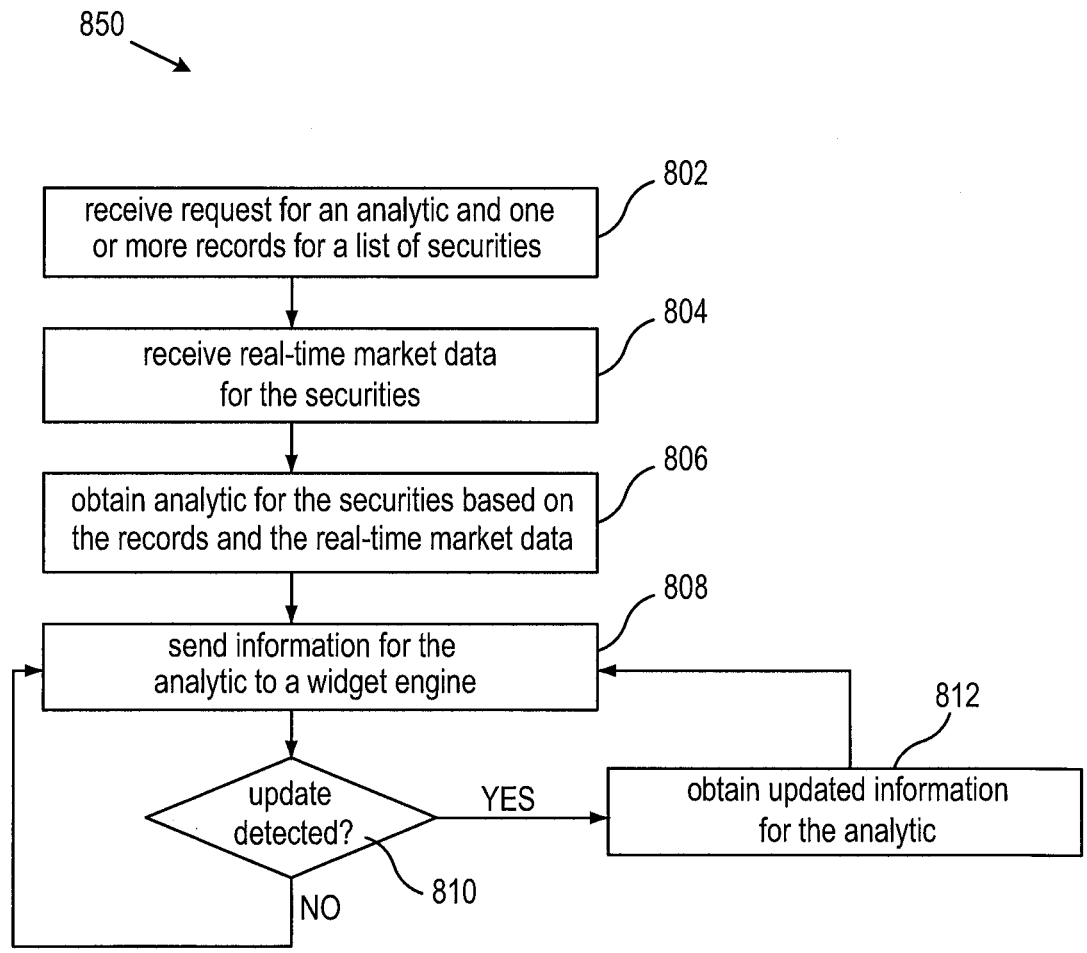
FIG. 8A is a flow chart illustrating a process for providing a real-time analytics to a user of a securities trading system using widgets according to an embodiment of the present invention.

FIG. 8A is a flow chart illustrating a process 800 for providing a real-time analytics to a user 102 of a securities trading system according to an embodiment of the present invention. Those of skill in the art will appreciate that the steps in the process 800 can be performed by hardware, firmware, or software stored in a computer readable medium and executed by one or more digital processors of a computer system. In other embodiments, all or part of the process 800 is encoded into special purpose hardware (e.g., one or more FPGAs or application specific integrated circuits ASICs). In some embodiments, all or part of the steps in the process 800 are performed by one or more servers executing a widget engine module 124 or a portion of a widget engine module 124. In some embodiments, the server is a client computer. In some embodiments, the server or servers are coupled to a client computer via a digital communication network.

The process 800 begins at step 802 when a widget engine module 124 receives a request (e.g., from a controller form 122) for a selected analytic. In some embodiments, the request also includes a set of one or more records (e.g., from a STS database 106*a*) corresponding to a list of one or more securities selected from a trading system interface or blotter 104. In some embodiments, the request may comprise the list of one or more securities and the widget engine module 124 accesses the corresponding records independently. In some embodiments, receiving the request includes receiving the request over a digital communication network from a controller form 122 executing on a client computer. In some embodiments, receiving the request includes receiving the request between processes executing on the same computer (e.g., via inter-process communications). Analogous methods of receiving the request will be understood to persons of skill in the art.

At step 804, the widget engine module 124 receives market data (e.g., volume, volatility, spread, etc.) for the list of one or more securities indicated in the request. Preferably, the market data includes real-time market data (i.e., data indicative of current market conditions or intraday market conditions). In some embodiments, the market data also includes historical market data (i.e., data indicative of past market conditions or market conditions over a predetermined period of time in the past). In some embodiments, the market data also includes transaction data for the list of securities (e.g., data relating to transaction records in the STS database 106*a*).

At step 806, the widget engine module 124 obtains the requested analytic for the list of securities based on the one or more records and the real-time market data. In some embodiments, the analytic is also based upon historical market data. In some embodiments, the widget engine module 124 obtains the analytic by performing calculations on the market data. In some embodiments, all or part of the calculations for the analytic are performed by other software coupled to the widget engine module 124 (e.g., software coupled to the widget engine module 124 via inter-process communications). In some embodiments, all or part of the calculations for the analytic are performed by one or more other computers coupled to the widget engine module 124 by a digital communication network.

At step 808, the widget engine module 124 sends information describing a graphical representation of the requested analytic to a widget engine module 124 (or a portion of a widget engine module 124) to display a graphical representation of the selected analytic on a display of a client computer. In some embodiments, sending the information includes sending the information between processes executing on the same computer (e.g., via inter-process communications). Analogous methods of sending the request will be understood to persons of skill in the art. In some embodiments, the information comprises a digital image or other standard graphics format. In other embodiments, the information comprises numerical information that describes salient features of the requested analytic and the graphical representation may be generated at the client computer or other computer coupled to the client computer based on the received description.

At step 810, the widget engine module 124 determines whether any updates to records to the real-time market data. In some embodiments, the update includes new information based on real-time market data for the list of securities (e.g., a change in the market price, volume, volatility, etc. of a security) or based on real-time data relating to transaction executions for the list of securities (e.g., an execution, partial execution, or other change in the STS database 106*a*).

In the case that the widget engine module 124 detects updated information, at step 812 the widget engine module 124 obtains updated information for the requested analytic based on the updates to the one or more records or the real-time market data and sends the updated information to the widget engine 124 (step 808). In some embodiments, the updated information is a description of differences between the updated analytic and the previously sent information. In some embodiments, the updated information includes information for the entire updated analytic independent of the previously sent information.

In some embodiments, the widget engine module 124 is configured to automatically detect updates to the records or market data after a predetermined period of time (e.g., every two minutes). In some embodiments, detecting the update includes receiving information from the securities trading system that transaction data or other record information for one or more of the securities has been updated.

Figure 8B:
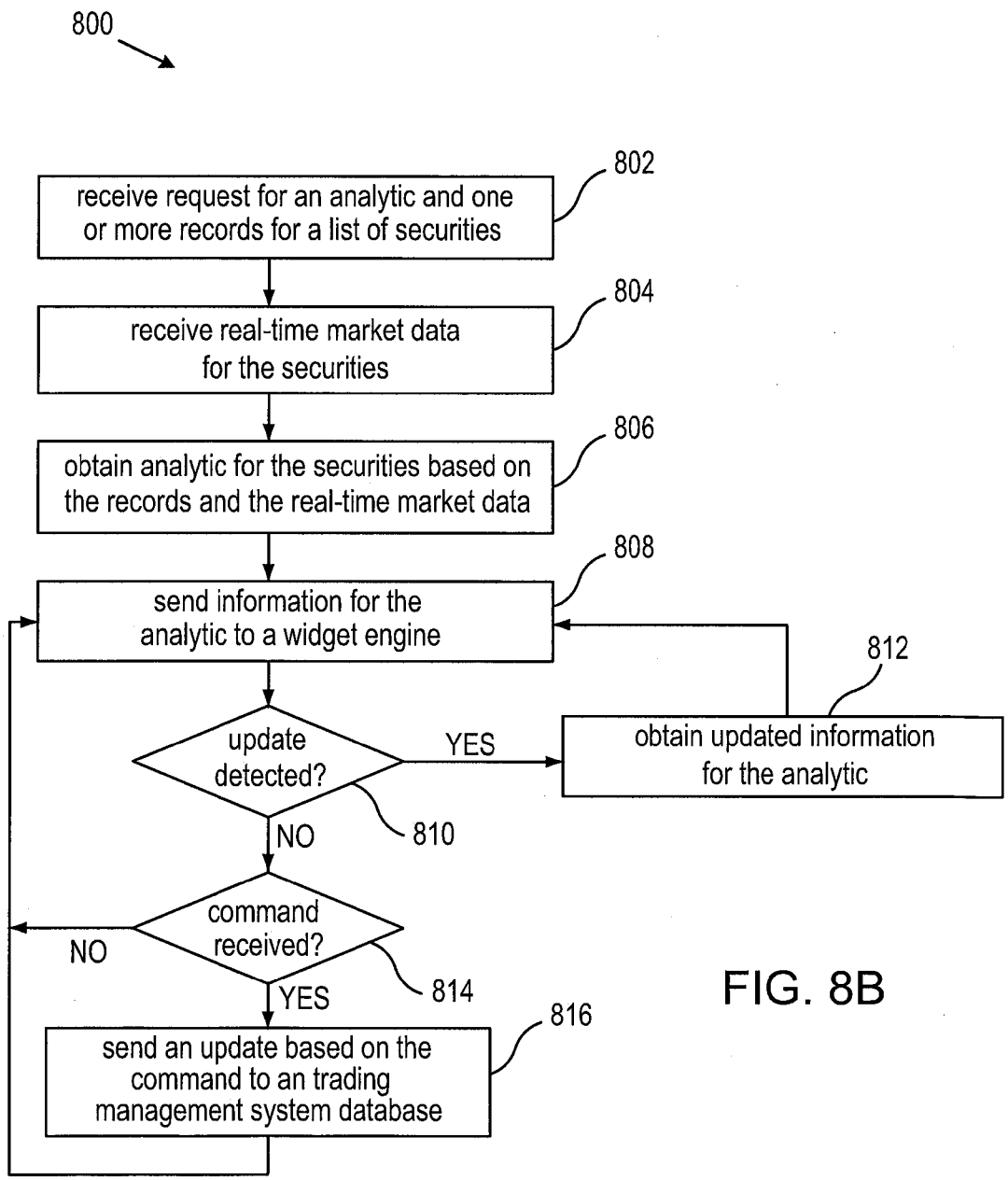
FIG. 8B is a flow chart illustrating a process for providing a real-time analytics to a user of a securities trading system using widgets according to an embodiment of the present invention.

In some embodiments, the analytic widget 140 or components provided by the widget module 120 include user interface elements that enable a user 102 to interact with the analytic widget 140 and adjust trading strategies and other trading information directly from the analytic widget 140. FIG. 8B illustrates a process 850 for providing a real-time analytics to a user 102 of a securities trading system according to some aspects of the present invention. The process 850 is similar to the process 800 with some additional steps.

At step 814, the widget engine 124 determines whether a command to update a record in the STS database 106*a* has been received from the analytic widget 140. For example, in some embodiments a user can select from a menu of trade strategies displayed in an analytic widget 140 or select data from the graphical representation of the analytic to update the records stored in the STS database 106*a* (e.g., to adjust a target price or share value).

At step 816, the widget engine 124 sends the update indicated by the command to the STS database 106*a*. In some embodiments, the command is sent to the STS database 106*a* via the widget engine module 124. In other embodiments, the update is sent via the trading system management interface 104. In some embodiment, the update is sent to the STS database 106*a* directly or via an OMS integration module.

In response to receiving the request, at step 714, the analytic widget 140 sends the update indicated by the command to the STS database 106*a*. In some embodiments, the command is sent to the STS database 106*a* via the trading system management interface 104. In some embodiments, the update is sent to the STS database 106*a* directly or via an OMS integration module.

In embodiments of the present invention, one or more of the following widgets may be provided to a user of a securities trading system:

Pre-Trade Widget—The Pre-Trade widget 900 can be configured to provide a simple presentation of the tradeoffs between cost estimates and cost standard deviations among various trade execution strategies using analytics such as those provided by ITG Logic®. In the embodiment illustrated in FIG. 9A, the Pre-Trade widget 900 is configured to utilize real-time market data and historical market data for the list of securities to calculate a predicted transaction cost 902 and standard deviation 904 for a plurality of pre-selected trade strategies 906. The Pre-Trade widget 900 illustrated in FIG. 9A can also be configured to display icons 908 that provide an overview of how each trading strategy 906 will allocate trades throughout the trading day.

The preselected strategies can include:

Volume Weighted Average Price ("VWAP")—a trading strategy that executes shares to match the predicted volume pattern over a desired trade horizon. The user specified trade horizon determines the participation rate needed to complete the trade. Other aspects of a VWAP trading strategy in accordance with some aspects of the invention are disclosed in U.S. patent application Ser. No. 09/699,503, incorporated herein by reference in its entirety.

Agency Cost Estimator ("ACE")—one or more strategies that seek to balance the expected cost of a transaction with the expected timing risk (e.g., opportunity cost) for a given level of urgency (i.e., risk aversion). For examples, ACE Passive (e.g., no urgency) indicates a desire to minimize expected cost without considering timing risk, generally resulting in longer trade horizon; ACE Aggressive (e.g., higher urgency) indicates a higher risk aversion with some consideration of expected cost, generally resulting in shorter trade horizon. Other aspects of ACE trading strategies in accordance with some aspects of the invention are disclosed in U.S. patent application Ser. No. 10/166,719, incorporated herein by reference in its entirety.

Volume Participation—a strategy that executes shares by participating proportionately to the predicted volume pattern (e.g., based on historical volume patterns) according to a user specified rate. In some embodiments, the user specified rate determines the specified horizon.

Uniform—a strategy that executes an equal numbers of shares at a predetermined number of time intervals.

Figures 9A, 9B:
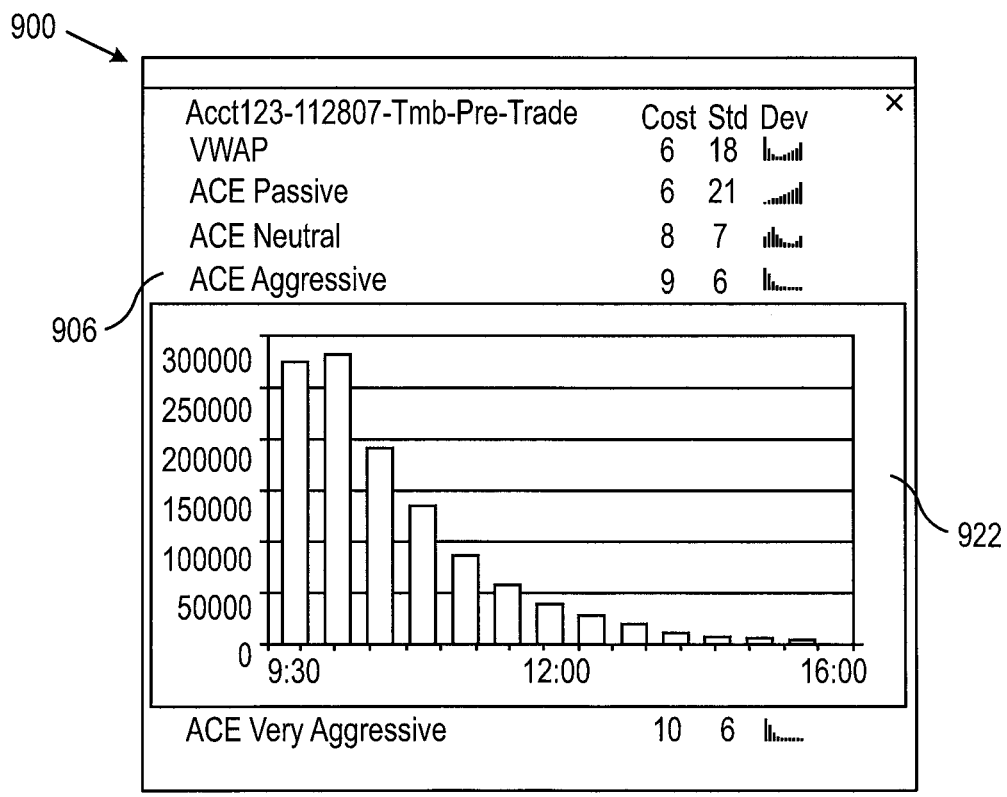
FIG. 9A illustrates a widget for providing a pre-trade analytic according to an embodiment of the present invention.
FIG. 9B illustrates the pre-trade widget of FIG. 9A with an enlarged graphical representation of one of the pre-trade strategies according to an embodiment of the present invention.

As illustrated in FIG. 9B, in response to a user 102 selecting an individual strategy 906 (e.g., "ACE Aggressive"), the Pre-Trade widget 900 can be configured to display a detailed illustration of the intraday trade distributions 922 of the strategy. In some embodiments, a day is divided into a number of predetermined time bins, and a portion of the total orders (e.g., a portion of the target execution size) is allocated to each time bin.

Figure 9C:
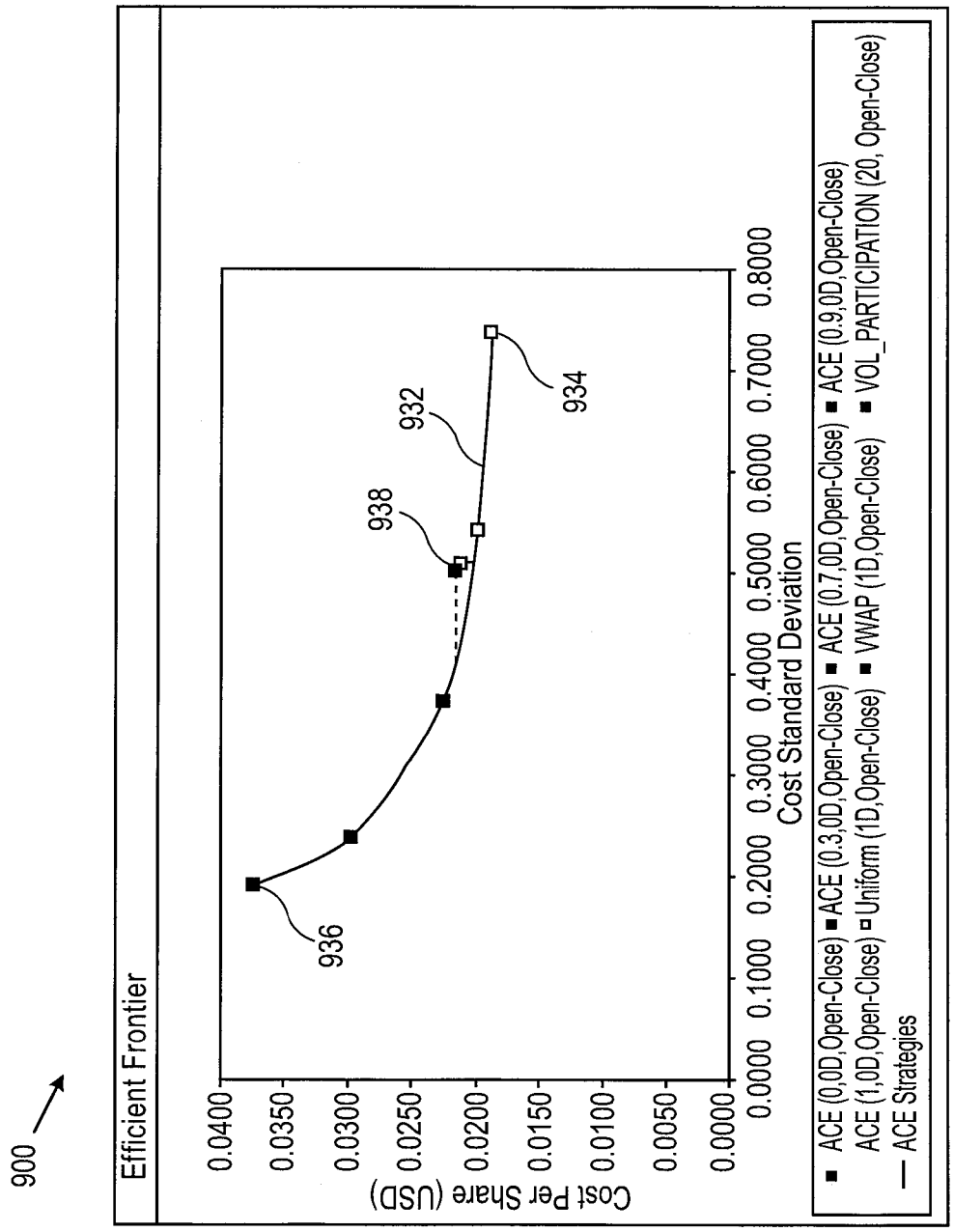
FIG. 9C illustrates a widget for providing a pre-trade analytic according to an embodiment of the present invention.

In the embodiment illustrated in FIG. 9C, the Pre-Trade widget 900 is configured to display the trade-offs between expected costs and opportunity cost across various strategies with different urgencies and participation rates. The graphical representation in FIG. 9C depicts the apparent trade-offs between the predetermined strategies 906, with opportunity cost (i.e., risk) along the X-axis (lower is better), and expected costs along the Y axis (lower is better). Every dot on the graph represents one of the predetermined strategies 906. In some embodiments, the graphical representation can include a curve 932 representing the "efficient frontier" for the trade. The efficient frontier illustrated in FIG. 9C represents the lowest possible expected cost for a given risk value, or alternatively the lowest available risk value for a given expected cost. In some embodiments, the graphical representation can also include points representing the expected costs and risks of the predetermined strategies 206. For example, in FIG. 9C the dot 934 represents the most passive strategy (e.g., ACE Passive) and therefore indicates the lowest expected cost, but the highest risk. On the other hand, the dot 936 represents the most aggressive strategy (e.g., ACE Very Aggressive) and hence will have a high expected cost, but a relatively low risk. A switch from a passive strategy to an aggressive strategy will result a significant increase in expected costs while the opportunity cost will be significantly reduced. Furthermore, in FIG. 9C the dots 938 on the represent strategies that are inferior to the strategies on the efficient frontier. Instead of picking one of the strategies corresponding to the dots 938, a user can simply pick a strategy that have the same cost estimate but with a lower opportunity cost or a strategy on the efficient frontier that has the same opportunity cost but a lower cost estimate.

Furthermore, in some embodiments, the Pre-Trade widget 900 can be configured to provide more detailed reports 950 that identify outliers from the list of one or more securities (e.g., orders that need special attention because their characteristics will cause them to have a higher probability of incurring greater transaction costs). An example report 950 is illustrated in FIG. 9D.

Figure 10:
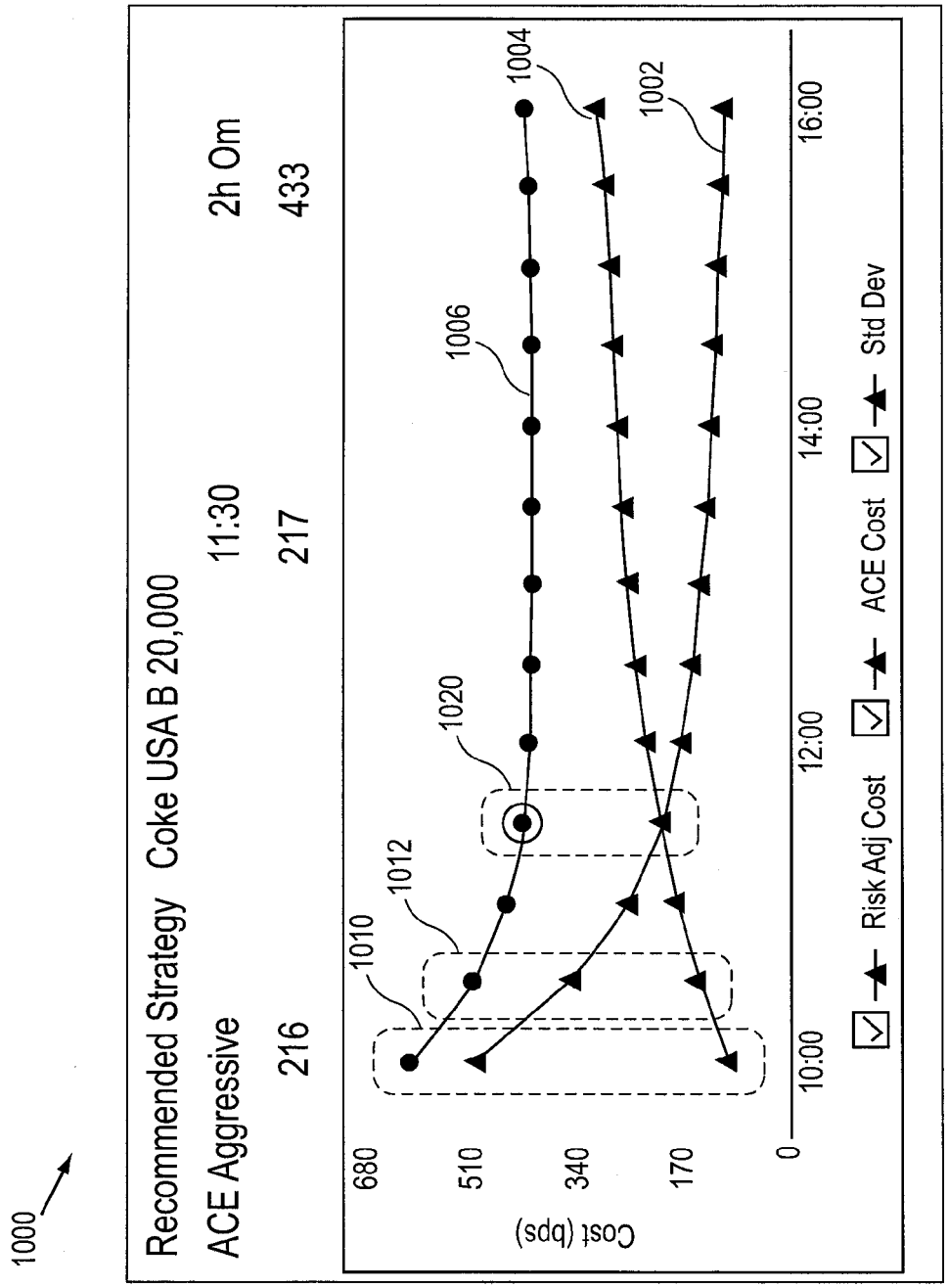
FIG. 10 illustrates a widget for providing a recommended strategy analytic according to an embodiment of the present invention.

Recommended Strategy—The Recommended Strategy widget 1000 can be configured to provide a comparison of expected costs and opportunity costs across various trading horizons. In the embodiment illustrated in FIG. 10, the Recommended Strategy widget 1000 is configured to display the marginal contribution to expected cost 1002 relative to the marginal contribution to opportunity cost 1004 (a standard deviation of the expected cost) by extending the trade horizon. The Recommended Strategy widget can be configured to recommend a trading strategy that will minimize risk adjusted cost 1006 (e.g., expected cost+opportunity costs). It can also be configured to chart how costs differ by varying trading horizon. As illustrated in FIG. 10, the risk adjusted cost can be calculated for a set number of time intervals (e.g., every 30 minutes throughout the remainder of the trading day). In FIG. 10, the first set of points 1010 on the left represent the expected costs, the opportunity costs, and the risk adjusted cost of trading the order in 30 minutes, the second set of points 1012 represent the costs of trading the order in 60 minutes, etc. Preferably, the Recommended Strategy widget 1000 can recommend a trading horizon at an "optimal point" of the strategy i.e., a point at which marginal contribution to expected cost equals to marginal contribution to opportunity cost (e.g., a trading horizon corresponding to the set of points at 1020).

In some embodiments, the Recommended Strategy Widget may be configured to calculate ACE costs (e.g., expected ACE costs and ACE cost standard deviations) for a plurality of ACE strategies (e.g., ACE Passive, ACE Neutral, ACE Aggressive, and ACE Very Aggressive), and, for each ACE strategy, identify the trading horizon at which marginal contribution to expected cost equals to marginal contribution to opportunity cost. Preferably, the Recommended Strategy widget can select the ACE strategy for which the optimal point has the lowest risk adjusted cost.

Figure 11A:
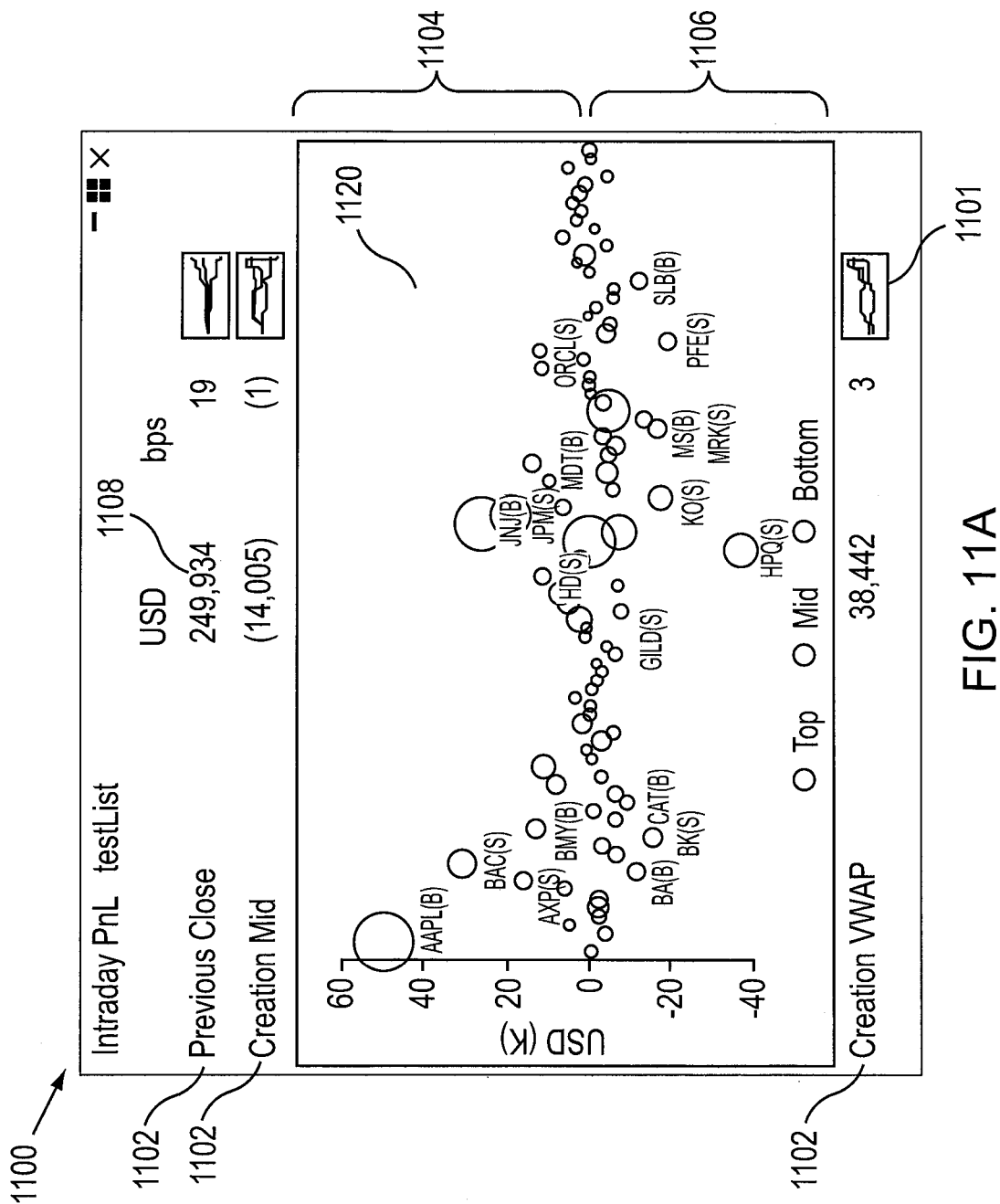
FIG. 11A illustrates a widget for providing an intraday PnL analytic according to an embodiment of the present invention.

Intraday PnL—As illustrated in FIG. 11A, an Intraday PnL widget 1100 can be configured to provide intraday real-time aggregate performance information for the list of one or more securities. In the embodiment of FIG. 11A, the Intraday PnL widget 1100 is configured to display a "bubble" chart 1120 on which the performance of trades in each of the securities in the selected list of securities is plotted in relation to a selected benchmark 1102. Available benchmarks 1102 can include:

Previous Close—the closing price for the previous day;

Open—the opening price for the current day;

VWAP—the volume weighted average price starting from market open for the current day;

Last—the most recent trade at which a trade was executed for the security;

Current Mid—the current mid value (an average of the current of bid and ask values);

Creation Mid—the mid value at the time the trade was entered into the securities trading system;

Submission Mid—the mid value at the time the first order of the trade was submitted to a broker; and Creation VWAP—VWAP starting from the time the trade was entered into the securities trading system.

In the embodiment of FIG. 11A, the y-axis position of each security represents the performance of trades in that security (e.g., bubbles 1104 above the x axis represent trades that have performed better than the selected benchmark 1102, while bubbles 1106 below the x axis represent trades that have performed worse than the selected benchmark). The size of each bubble can be adjusted to indicate the value of the transaction.

Furthermore, the Intraday PnL widget 1100 can be configured to display real-time numerical representation 1108 for the aggregate performance of the list against each benchmark 1102 (e.g., in a currency such as USD), and to display graph icons 1110 that illustrate the aggregate performance of the list over a predetermined period of time.

Figure 11B:
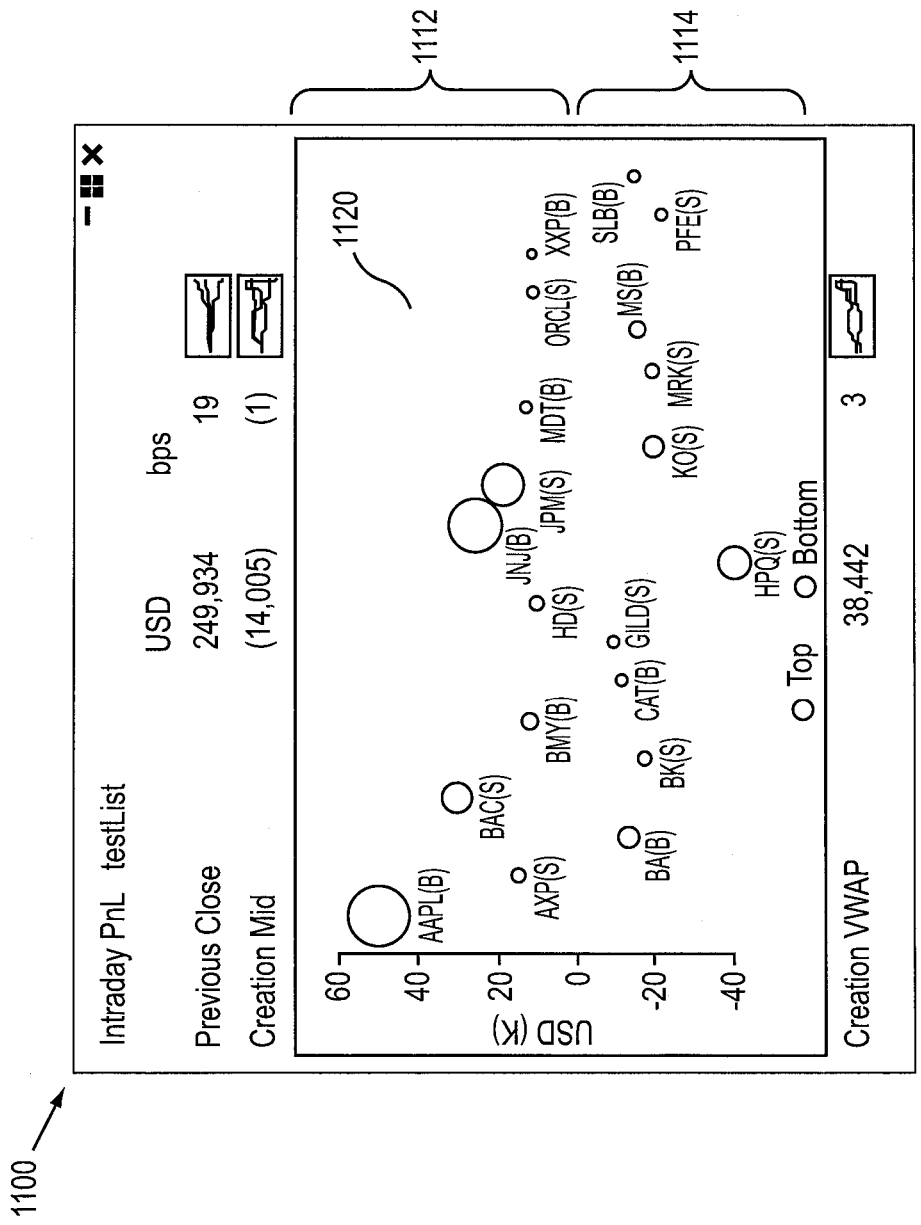
FIG. 11B illustrates the intraday PnL widget of FIG. 11A with a subset of securities displayed according to an embodiment of the present invention.

In the embodiment illustrated in FIG. 11B, the Intraday PnL widget 1100 is configured to enable a user 102 to filter the display of the bubble chart 1120 to only display information for a predetermined number of securities from the list (e.g., the ten transactions 1112 with the best performance relative to the selected benchmark 1102, and the ten transactions 1114 with the worst performance relative to the selected benchmark 1102).

Figure 11C:
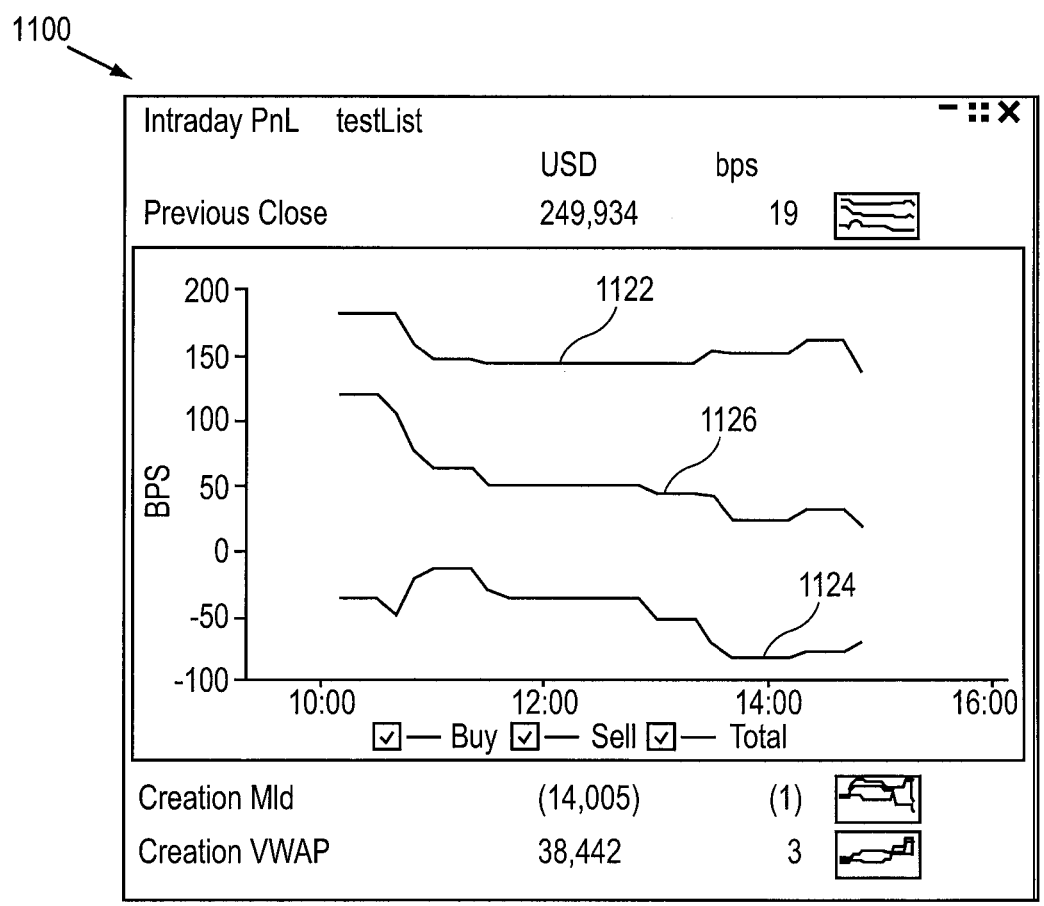
FIG. 11C illustrates the intraday PnL widget of FIG. 11A with an aggregate PnL analytic according to an embodiment of the present invention.

In the embodiment illustrated in FIG. 11C, the Intraday PnL widget 1100 is further configured to provide aggregate performance of the entire list in relation to one or more of the selected benchmarks 1102 over a predetermined period of time. As illustrated in FIG. 11C, the Intraday PnL Widget can display the aggregate performance of all buy orders in the list 1122, all sell orders in the list 1124, and the total performance of the list 1126 over a portion of a trading day.

In some embodiments, the Intraday PnL widget 1100 is further configured to enable a user 102 to select an individual bubble from the bubble chart to view detailed single-trade intraday progress of the selected security. In the embodiment illustrated in FIG. 11D the Intraday PnL widget 1100 is configured to include options 1142 for displaying the price 1132 of the stock, the volume weighted average price ("VWAP"), the selected benchmark 1102, the average execution price 1138, individual trades (e.g., based on records from the STS database 106*a*), the creation VWAP, and creation time benchmark. The selected data can be plotted over a predetermined period of time in the chart area 1144.

Figure 11D:
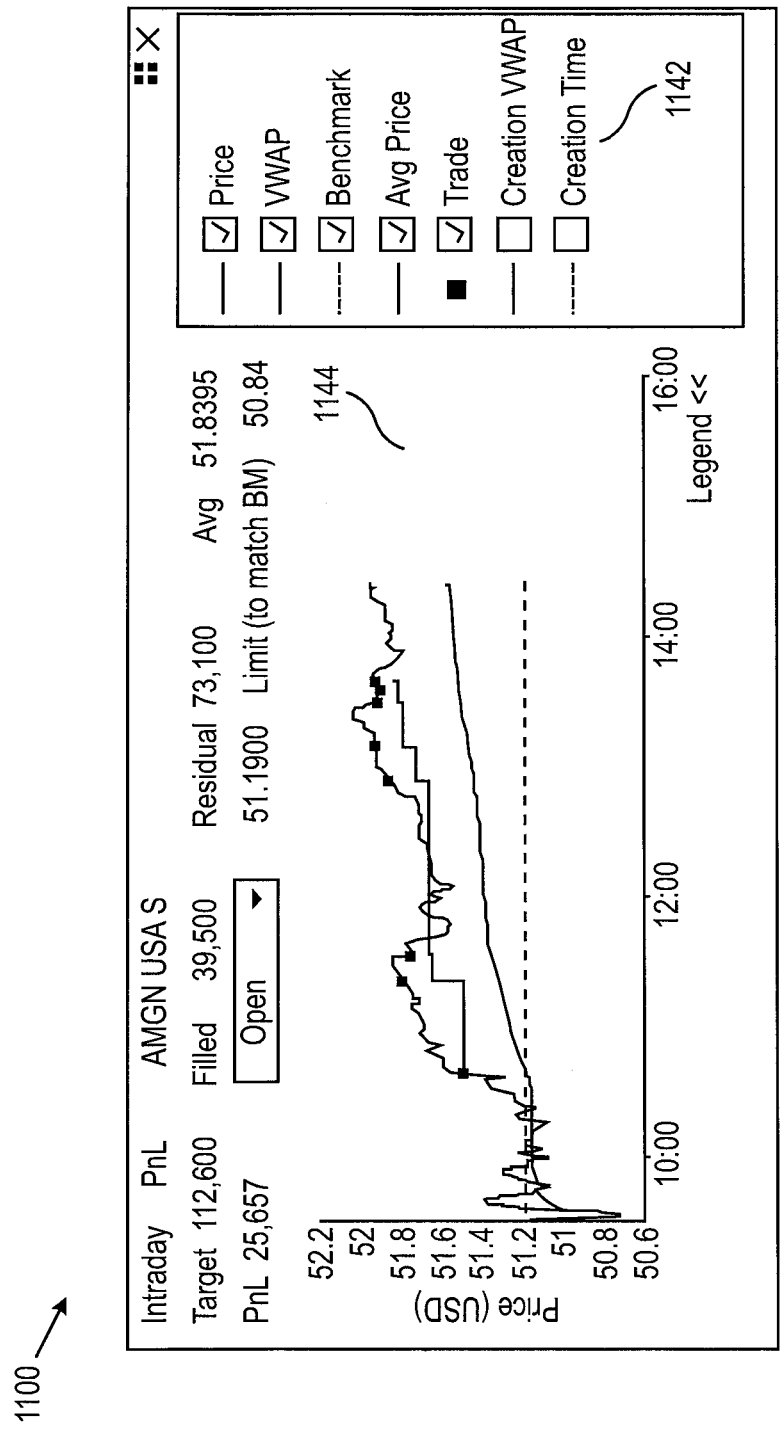
FIG. 11D illustrates the intraday PnL widget of FIG. 11A with an individual security displayed according to an embodiment of the present invention.

The Intraday PnL widget 1100 illustrated in FIG. 11D is also configured to include a ticker symbol, target execution size, filled and residual shares, and an average execution price based on a record from the securities trading system. The Intraday PnL widget 1100 can be further configured to include a drop down menu for selecting from one or more available benchmarks 1102, and a recommended limit price for matching the selected benchmark. In some embodiments, the Intraday PnL widget 1100 is configured to enable a user 102 can select the suggested limit price and update the records corresponding to the selected security in the STS database 106*a*.

Using the Intraday PnL widget 1100, a use 102 can view trades 1132 in real-time relative to one or more benchmarks 1102 and the stock's price movements 1134. This capability enables a user 102 to observe how an automated strategy that is being executed behaves as the automated executions for the strategy will be displayed in updates to the graph. In some embodiments, the Intraday PnL Widget can be configured to automatically refresh real-time market data and trade information, providing the user 102 with a continuous, up-to-date view of trade progress and outliers.

Figure 12:
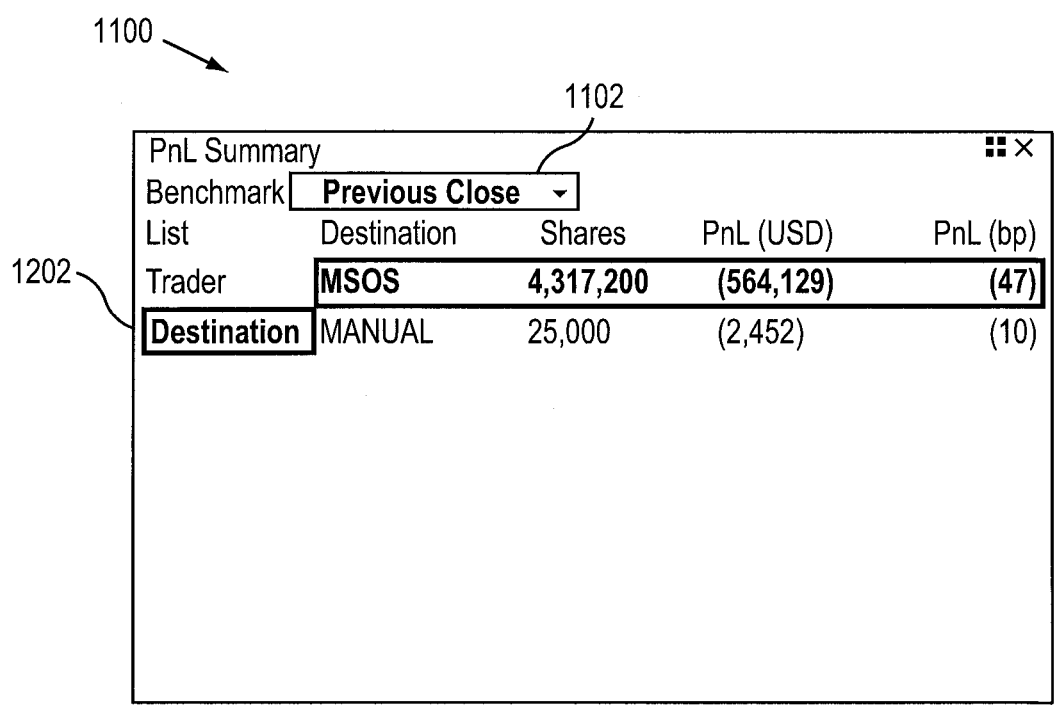
FIG. 12 illustrates a widget for providing a summary PnL analytic according to an embodiment of the present invention.

Summary PnL—As illustrated in FIG. 12, the Summary PnL widget 1200 can be configured to display performance information (e.g., number of shares, PnL in USD, PnL in basis points) for a list of one or more securities in relation to a selected benchmark 1102, aggregated by a selected category 1202 (e.g., List, Trader, Destination, etc.).

Volume Monitor—The Volume Monitor widget 1300 helps a user 102 monitor the average historical market volume, the current volume market, and their own volume simultaneously. In the embodiment illustrated in FIG. 13 the Volume Monitoring widget is configured to divide a trading day into a predetermined number of time bins. For each time bin, the Volume Monitoring widget can be configured to display the historical market volume 1302 (i.e., the average market volume for that time bin over a predetermined period of time (e.g., over the past month)), the current market volume 1304 (i.e., the market volume of that time bin for the current trading day), and the volume 1306 traded by the user 102 during that time bin.

Figure 13:
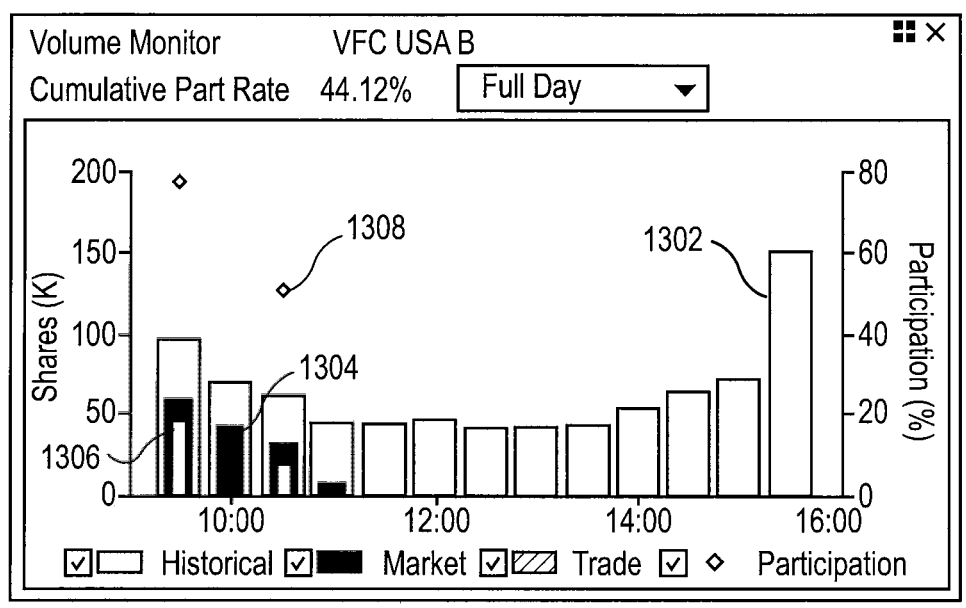
FIG. 13 illustrates a widget for providing a volume monitor analytic according to an embodiment of the present invention.

As further illustrated in FIG. 13, in some embodiments the Volume Monitor Widget is configured to display a relative portion 1308 (i.e., participation rate) of the security traded by the user 102 (e.g., the portion of the target execution size transacted during that time bin). In some embodiments, the participation rate may be based on market volume from the opening of the market day to the current time bin, market volume from the time when the order was created in the STS database 106*a* until the order is completed, market volume from the time when the order was created in the STS database 106*a* until the current time, or other suitable bases understood to persons having skill in the art.

Volume statistics are embedded in many automated trading strategies so for example, lack of intraday volume might suggest switching to a more opportunistic strategy as opposed to a structured strategy, while high intraday volume relative to historical levels might support a more structured strategy.

Figure 14:
FIG. 14 illustrates a widget for providing a trade distribution analytic according to an embodiment of the present invention.

Trade Distribution—The Trade Distribution widget 1400 can be configured to compare the actual trade distribution for the selected entry against the selected pre-trade strategy. In the embodiment illustrated in FIG. 14, the Trade Distribution widget 1400 is configured to display the selected strategy as a number of shares per predetermined time interval as a first bar graph 1402, and display the actual amount of shares executed during each time interval as a second bar graph 1404.

Figure 15:
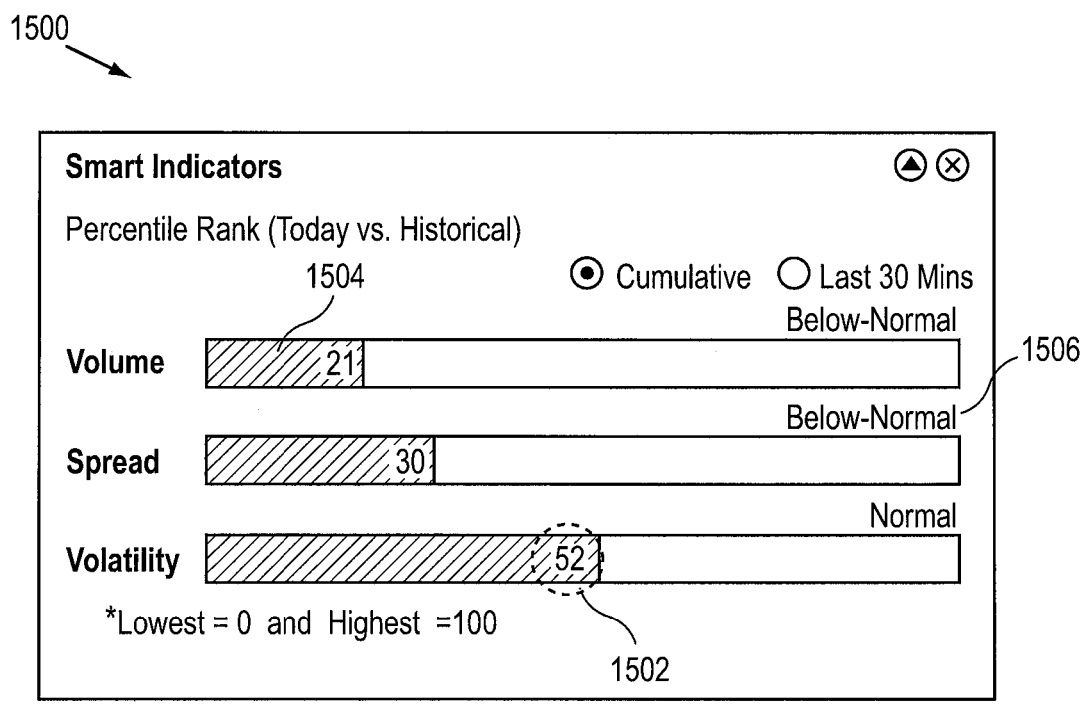
FIG. 15 illustrates a widget for providing a smart indicator analytic according to an embodiment of the present invention.

Smart Indicator—The Smart Indicator widget 1500 can be configured to provide indications of abnormality in one or more securities by comparing current attribute of the security (e.g., volume, bid ask spread, volatility, etc.) with an empirical distributing of such values. In some embodiments, the current attribute may be based on the behavior of the security over a predetermined period (e.g., over the entire trading day so far, over the last 30 minutes, etc.). As illustrated in FIG. 15, the Smart Indicators Widget can be configured to display the result of this comparison as a numerical percentile rank 1502, a bar graph 1504, a qualitative description 1506 (e.g., "Below-Normal," "Normal," "Above-Normal," etc.) or other representations understood by those having skill in the art (e.g., standard deviations, etc.).

As illustrated in FIG. 15, in some embodiments, the Smart Indicator widget 1500 can be configured to generate the empirical distribution based of historical data for the list of one or more securities. For example, the empirical distribution may be a distribution of values of the attribute for the list of one or more securities over a predetermined time period. Thus the Smart Indicator Widget can be configured to display the degree to which the attribute of list of one or more securities differs from historical behavior.

In some embodiments, Smart Indicator widget 1500 can be configured to generate the empirical distribution of values over a peer group of the list of securities. As used herein, a peer group of the list of securities can be a plurality of other securities that share common attributes with the list (e.g., industry sector, average volume, etc.). Thus the Smart Indicator Widget can be configured to display the degree to which the attribute of list of one or more securities differs from the attributes of the peer group by identifying where in the empirical distribution the list of securities fall.

The Smart Indicator widget 1500 can be further configured to utilize an analytic metric for the attribute of the security. As used herein, an analytic metric comprises a relation between an expected value of an attribute (e.g., a value predicted by a model) and the value actually observed (e.g., a value obtained by real-time market data).

Other aspects of Smart Indicators in accordance with some aspects of the invention are disclosed in U.S. patent application Ser. No. 11/476,895, incorporated herein by reference in its entirety.

Figure 16:
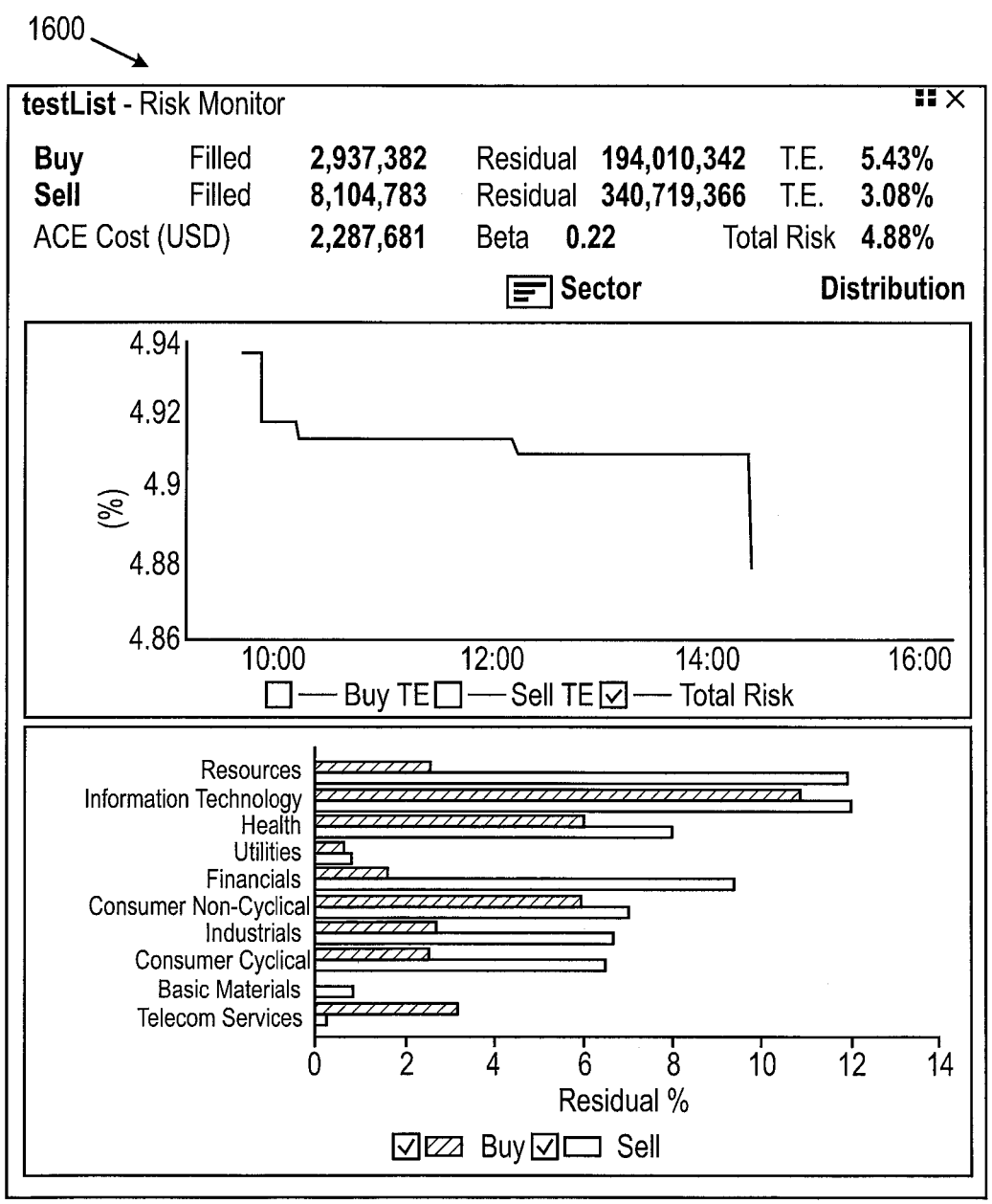
FIG. 16 illustrates a widget for providing a risk monitor analytic according to an embodiment of the present invention.

Risk Monitor—The Risk Monitor widget 1600 can be configured to chart the residual risk trajectory for the list of one or more securities. In some embodiments, the Risk Monitor Widget is configured to monitor the residuals of list of one or more securities and, on a pre-defined time interval, to calculate the Total Risk, tracking error of the buy positions, and tracking error of the sell positions. As illustrated in FIG. 16, in some embodiments the Risk Monitor widget 1600 is configured to enable a user 102 to view the residual risk in comparison to:

Buy (Sell) Filled—the value of all filled buy (or sell) orders in the list;

Buy (Sell) Residual—the estimated value of all residual buy (or sell) orders in the list, using the previous closing price of each stock;

Buy (Sell) T.E.—the tracking error of the Buy (Sell) residual trade list, i.e., an annualized standard deviation of the difference in return between the buy (or sell) side of the list and the benchmark;

ACE Cost—the total expected ACE Cost for the residual trade list;

Beta—the Beta of the residual tradelist, i.e., a multiplier measuring the return response of the trade list to the benchmark (e.g., an index portfolio such as S&P 500); and Total Risk—the total risk of the residual trade list, i.e., the annualized standard deviation of the return of the trade list. Buys are interpreted as short positions while sells are interpreted as long positions.

The Risk Monitor Widget 1600 can be further configured to enable a user 102 to view the residual trade value by industry sector (for buy orders and sell orders) or a total distribution of buy and sell orders over time.

While various embodiments of the present invention have been described above, it should be understood that they have been presented by way of example only, and not limitation. For example, while widget menus and analytics have been described as preferably being displayed in a predetermined area on a user display, the system may be configured to allow the menus and/or analytics to be resized, moved and/or minimized by the user. Thus, the breadth and scope of the present invention should not be limited by any of the above described exemplary embodiments. Moreover, any combination of the above described elements is encompassed by the invention unless otherwise indicated herein or otherwise clearly contradicted by context.

The invention claimed is:

1. A method of providing real time analytics to a user of a securities trading system, comprising:
    (a) displaying in a first predetermined display area of an electronic display device a user interface for said securities trading system;
    (b) sending to a widget engine on a computer separate from said user interface, a list of one or more securities selected from said securities trading system and a request for an analytic for said one or more securities, said analytic selected from a predetermined set of one or more analytics;
    (c) receiving from said widget engine information about said requested analytic based on one or more records from said securities trading system corresponding to said list and based on real-time market data;
    (d) displaying in a second pre-determined display area of an electronic display device a graphical representation of said requested analytic based on said received information;
    (e) receiving from said widget engine updated information describing said requested analytic based on an update to said one or more records or an update to said market data; and
    (f) displaying in said second pre-determined display area an updated graphical representation of said requested analytic based on said received updated information.

2. The method of claim 1, further comprising:
    (g) waiting for a predetermined period of time; and
    (h) repeating said steps (e) and (f) after said predetermined period of time has lapsed.

3. The method of claim 1, wherein said second predetermined display area includes a pop up window.

4. The method of claim 1, wherein said second predetermined display area includes a portion of said first predetermined display area.

5. The method of claim 1, further comprising:
    (g) receiving from a user interface coupled to said graphical representation of said requested analytic a request to modify a record in said securities trading system; and
    (h) sending to said securities trading system information describing said requested modification.

6. The method of claim 1, wherein said requested analytic is based at least in part on historical market data.

7. The method of claim 1, further comprising: (g) sending to said widget engine transaction data from said securities trading system for said list of one or more securities, wherein said market data includes said transaction data.

8. The method of claim 7, further comprising:
    (h) detecting an update of said transaction data; sending to said widget engine said updated transaction data;
    wherein said updated market data includes said updated transaction data.

9. The method of claim 1, wherein said requested analytic comprises a comparison between a real-time value of a specified variable for a security and an empirical distribution of values of said specified variable.

10. The method of claim 9, wherein said empirical distribution of values is a distribution of real-time values of said specified variable for a peer group of said security.

11. The method of claim 9, wherein said empirical distribution of values is a distribution of historical values of said specified variable for said security over a specified period of time.

12. The method of claim 9, wherein said specified variable is a relation between an estimated value of an attribute for a security and a real-time value of said attribute for said security.

13. The method of claim 1, wherein interaction with said user interface of said securities trading system does not inhibit the steps of receiving said updated information and displaying said updated graphical representation of said requested analytic.

14. The method of claim 1, wherein the steps of receiving said updated information and displaying said updated graphical representation of said requested analytic do not inhibit interaction with user said interface of said securities trading system.

15. The method of claim 1, wherein said list of one or more securities includes a plurality of securities.

16. A system for providing real time analytics to a user of a securities trading system, comprising:
a computer operable to: display in a first predetermined display area of an electronic display device a user interface of said securities trading system including a list of one or more securities, and display a menu for requesting an analytic from among a predetermined set of one or more analytics; and
a widget engine module operable to:
in response to a request from said menu, obtain the requested analytic for said one or more securities based on one or more records stored in said securities trading system and real-time market data for said one or more securities, display in a second predetermined display area of said computer a graphical representation of said requested analytic, update said requested analytic based on an update to said one or more records or to said market data, and update the display of said graphical representation based on said update to said requested analytic.

17. The system of claim 16, wherein the widget engine module is further operable to:
periodically update said requested analytic at a predetermined time interval; and
periodically update the display of said graphical representation based on said periodic updates to said requested analytic.

18. The system of claim 16, wherein said second predetermined display area includes a pop up window.

19. The system of claim 16, wherein said second predetermined display area includes a portion of said first predetermined display area.

20. The system of claim 16, wherein said widget engine module is further operable to:
display a widget user interface coupled to said graphical representation, and modify a record in said securities trading system based on interactions with said widget user interface.

21. The system of claim 16, wherein said widget engine module is further operable to, in response to a request from said menu, obtain the requested analytic for said one or more securities based at least in part on historical market data for said one or more securities.

22. The system of claim 16, wherein said widget engine module is further operable to, in response to a request from said menu, obtain the requested analytic for said one or more securities based at least in part on transaction data for said one or more securities.

23. The system of claim 22, wherein said widget engine module is further operable to update said requested analytic based on updated transaction data.

24. The system of claim 16, wherein said requested analytic comprises a comparison between a real-time value of a specified variable for a security and an empirical distribution of values of said specified variable.

25. The system of claim 24, wherein said empirical distribution of values is a distribution of real-time values of said specified variable for a peer group of said security.

26. The system of claim 24, wherein said empirical distribution of values is a distribution of historical values of said specified variable for said security over a specified period of time.

27. The system of claim 24, wherein said specified variable is a relation between an estimated value of an attribute for a security and a real-time value of said attribute for said security.

28. The system of claim 16, wherein interaction with said user interface of said securities trading system does not inhibit the widget engine module from updating said requested analytic and does not inhibit the widget engine module from updating the display of said graphical representation.

29. The system of claim 16, wherein the widget engine module updating said requested analytic and the widget engine module updating the display of said graphical representation does not inhibit interaction with said user interface of said securities trading system.

30. The system of claim 16, wherein said list of one or more securities includes a plurality of securities.

31. A non-transitory computer program product for providing real time analytics to a user of a securities trading system, said computer program product comprising a digital storage media and a set of machine readable instructions stored on said digital storage media, wherein said instructions are executable by a computer to:
(a) display in a first predetermined display area of an electronic display device a user interface for said securities trading system;
(b) send to a widget engine a list of one or more securities selected from said securities trading system and a request for an analytic for said one or more securities, said analytic selected from a predetermined set of one or more analytics;
(c) receive from said widget engine information about said requested analytic based on one or more records from said securities trading system corresponding to said list and based on real-time market data;
(d) display in a second pre-determined display area of an electronic display device a graphical representation of said requested analytic based on said received information;
(e) receive from said widget engine updated information describing said requested analytic based on an update to said one or more records or an update to said market data; and
(f) display in said second pre-determined display area an updated graphical representation of said requested analytic based on said received updated information.

32. The computer program product of claim 31, wherein said instructions are further executable by a computer to:
(g) wait for a predetermined period of time; and
(h) repeat steps (e) and (f) after said predetermined period of time.

33. The computer program product of claim 31, wherein said second predetermined display area includes a pop up window.

34. The computer program product of claim 31, wherein said second predetermined display area includes a portion of said first predetermined display area.

35. The computer program product of claim 31, wherein said instructions are further executable by a computer to: (g) receive from a user interface coupled to said graphical representation of said requested analytic a request to modify a record in said securities trading system; and
(h) send to said securities trading system information describing said requested modification.

36. The computer program product of claim 31, wherein said requested analytic is based at least in part on historical market data.

37. The computer program product of claim 31, wherein said instructions are further executable by a computer to:
  (g) send to said widget engine transaction data from said securities trading system for said list of one or more securities, wherein said market data includes said transaction data.

38. The computer program product of claim 37, wherein said instructions are further executable by a computer to:
  (h) detect an update of said transaction data;
  (i) send to said widget engine said updated transaction data; wherein said updated market data includes said updated transaction data.

39. The computer program product of claim 31, wherein said requested analytic comprises a comparison between a real-time value of a specified variable for a security and an empirical distribution of values of said specified variable.

40. The computer program product of claim 39, wherein said empirical distribution of values is a distribution of real-time values of said specified variable for a peer group of said security.

41. The computer program product of claim 39, wherein said empirical distribution of values is a distribution of historical values of said specified variable for said security over a specified period of time.

42. The computer program product of claim 39, wherein said specified variable is a relation between an estimated value of an attribute for a security and a real-time value of said attribute for said security.

43. The computer program product of claim 31, wherein interaction with said user interface of said securities trading system does not inhibit the steps of receiving said updated information and displaying said updated graphical representation of said requested analytic.

44. The computer program product of claim 31, wherein the steps of receiving said updated information and displaying said updated graphical representation of said requested analytic do not inhibit interaction with user said interface of said securities trading system.

45. The computer program product of claim 31, wherein said list of one or more securities includes a plurality of securities.

46. A system for providing real time analytics to a user of a securities trading system, comprising:
  a first computer configured to display in a first predetermined display area of an electronic display device a user interface of said securities trading system including a list of one or more securities, and to display a menu for requesting an analytic from among a predetermined set of one or more analytics; and
  a second computer configured to, in response to a request from said menu, obtain the requested analytic for said one or more securities based on one or more records stored in said securities trading system and real-time market data for said one or more securities, to display in a second predetermined display area of said computer a graphical representation of said requested analytic, to update said requested analytic based on an update to said one or more records or to said market data, and to update the display of said graphical representation based on said update to said requested analytic;
  wherein the requested analytic includes a real-time value of a specified variable for a security obtained from said real-time market data, an empirical distribution of values of said specified variable, and a comparison of said real-time value with said empirical distribution of values to determine whether the condition of said security is abnormal.

\* \* \* \* \*